United States Patent
Binder

(10) Patent No.: US 7,522,714 B2
(45) Date of Patent: Apr. 21, 2009

(54) TELEPHONE OUTLET FOR IMPLEMENTING A LOCAL AREA NETWORK OVER TELEPHONE LINES AND A LOCAL AREA NETWORK USING SUCH OUTLETS

(75) Inventor: Yehuda Binder, Hod Hasharon (IL)

(73) Assignee: Serconet Ltd., Ráanana (IL)

( * ) Notice: Subject to any disclaimer, the term of this patent is extended or adjusted under 35 U.S.C. 154(b) by 593 days.

(21) Appl. No.: 11/338,855

(22) Filed: Jan. 25, 2006

(65) Prior Publication Data
US 2006/0133588 A1 Jun. 22, 2006

Related U.S. Application Data

(63) Continuation of application No. 10/827,349, filed on Apr. 20, 2004, now Pat. No. 7,123,701, which is a continuation of application No. 10/412,251, filed on Apr. 14, 2003, now Pat. No. 6,757,368, which is a continuation of application No. 09/531,692, filed on Mar. 20, 2000, now Pat. No. 6,549,616.

(51) Int. Cl.
*H04M 11/00* (2006.01)
(52) U.S. Cl. .................... 379/90.01; 379/93.08
(58) Field of Classification Search .... 379/90.01–93.08
See application file for complete search history.

(56) References Cited

U.S. PATENT DOCUMENTS

| | | | |
|---|---|---|---|
| 2,264,395 A | 12/1941 | Mitchell | |
| 2,264,396 A | 12/1941 | Moore | |
| 2,510,273 A | 6/1950 | Barstow et al. | |
| 2,516,211 A | 7/1950 | Hochgraf | |
| 2,568,342 A | 9/1951 | Koehler et al. | |

(Continued)

FOREIGN PATENT DOCUMENTS

EP 1 009 156 A2 6/2000

(Continued)

OTHER PUBLICATIONS

"The DSL Sourcebook", Paradyne Corporation, Copyright 2000, DSL-BOOK-3.0-0900, 98 pages.

(Continued)

*Primary Examiner*—Curtis Kuntz
*Assistant Examiner*—Maria El-Zoobi
(74) *Attorney, Agent, or Firm*—Browdy and Neimark, P.L.L.C.

(57) ABSTRACT

A network for transporting power and multiplexed data and digital telephone signals. The network includes at least three nodes and first and second wiring segments in a building for carrying the multiplexed data and digital telephone signals, and at least one of the segments is configured to additionally carry a power signal. A power consuming component is connected to the at least one wiring segment and is powered by the power signal carried by that segment. Each wiring segment connects a different pair of the nodes together to form, with nodes nodes, a packet based bi-directional communication link. One of the nodes contains communication link composed of a repeater, a bridge, or a router connectable to a data unit. At least one of the nodes is connected to a remote data unit external to the building for coupling the remote data unit to at least one of said communication links.

52 Claims, 11 Drawing Sheets

U.S. PATENT DOCUMENTS

| | | |
|---|---|---|
| 2,680,162 A | 6/1954 | Brehm et al. |
| 3,280,259 A | 10/1966 | Cotter |
| 3,369,078 A | 2/1968 | Stradley |
| 3,406,344 A | 10/1968 | Hopper |
| 3,511,936 A | 5/1970 | Saltzberg |
| 3,529,088 A | 9/1970 | Hauer |
| 3,539,727 A | 11/1970 | Pasternack |
| 3,651,471 A | 3/1972 | Hasselwood et al. |
| 3,699,523 A | 10/1972 | Percher |
| 3,723,653 A | 3/1973 | Tatsuzawa |
| 3,835,334 A | 9/1974 | Notteau |
| 3,870,822 A | 3/1975 | Matthews |
| 3,872,253 A | 3/1975 | Jurschak |
| 3,873,771 A | 3/1975 | Kleinerman et al. |
| 3,875,339 A | 4/1975 | Gruen et al. |
| 3,876,984 A | 4/1975 | Chertok |
| 3,922,490 A | 11/1975 | Pettis |
| 3,937,889 A | 2/1976 | Bell, III et al. |
| 3,949,172 A | 4/1976 | Brown et al. |
| 3,968,333 A | 7/1976 | Simokat et al. |
| 3,992,589 A | 11/1976 | Kuegler |
| 4,008,369 A | 2/1977 | Theurer et al. |
| 4,035,838 A | 7/1977 | Bassani et al. |
| 4,054,910 A | 10/1977 | Chou et al. |
| 4,058,678 A | 11/1977 | Dunn et al. |
| 4,171,467 A | 10/1979 | Evenchik |
| 4,197,431 A | 4/1980 | Vis |
| 4,206,320 A | 6/1980 | Keasler et al. |
| 4,232,200 A | 11/1980 | Hestad et al. |
| 4,241,243 A | 12/1980 | Ball |
| 4,262,171 A | 4/1981 | Schneider et al. |
| 4,302,629 A | 11/1981 | Foulkes et al. |
| 4,328,579 A | 5/1982 | Hashimoto et al. |
| 4,332,980 A | 6/1982 | Reynolds et al. |
| 4,339,816 A | 7/1982 | Reed |
| 4,367,548 A | 1/1983 | Cotten, Jr. et al. |
| 4,373,117 A | 2/1983 | Pierce |
| 4,378,470 A | 3/1983 | Murto et al. |
| 4,380,009 A | 4/1983 | Long et al. |
| 4,387,271 A | 6/1983 | Artom |
| 4,388,489 A | 6/1983 | Wigan et al. |
| 4,393,508 A | 7/1983 | Boudault |
| 4,395,590 A | 7/1983 | Pierce |
| 4,415,774 A | 11/1983 | Driver |
| 4,417,099 A | 11/1983 | Pierce |
| 4,425,642 A | 1/1984 | Moses et al. |
| 4,431,869 A | 2/1984 | Sweet |
| 4,433,212 A | 2/1984 | Moses et al. |
| 4,442,320 A | 4/1984 | James et al. |
| 4,442,540 A | 4/1984 | Allen |
| 4,443,662 A | 4/1984 | Nakhla |
| 4,444,999 A | 4/1984 | Sparrevohn |
| 4,449,218 A | 5/1984 | Strehl |
| 4,456,985 A | 6/1984 | Carsten et al. |
| 4,456,986 A | 6/1984 | Carsten et al. |
| 4,459,434 A | 7/1984 | Benning et al. |
| 4,475,193 A | 10/1984 | Brown |
| 4,479,033 A | 10/1984 | Brown et al. |
| 4,485,400 A | 11/1984 | Lemelson et al. |
| 4,493,948 A | 1/1985 | Sues et al. |
| 4,500,751 A | 2/1985 | Darland et al. |
| 4,506,387 A | 3/1985 | Walter |
| 4,507,721 A | 3/1985 | Yamano et al. |
| 4,514,594 A | 4/1985 | Brown et al. |
| 4,521,881 A | 6/1985 | Stapleford et al. |
| 4,523,307 A | 6/1985 | Brown et al. |
| 4,528,422 A | 7/1985 | Cupani |
| 4,543,450 A | 9/1985 | Brandt |
| 4,546,212 A | 10/1985 | Crowder, Sr. |
| 4,561,020 A | 12/1985 | Matsuda |
| 4,564,940 A | 1/1986 | Yahata |
| 4,577,311 A | 3/1986 | Duquesne et al. |
| 4,577,314 A | 3/1986 | Chu et al. |
| 4,578,533 A | 3/1986 | Pierce |
| 4,578,535 A | 3/1986 | Simmons |
| 4,578,540 A | 3/1986 | Borg et al. |
| 4,580,291 A | 4/1986 | ab der Halden |
| 4,583,214 A | 4/1986 | Miyashiita et al. |
| 4,584,690 A | 4/1986 | Cafiero et al. |
| 4,592,069 A | 5/1986 | Redding |
| 4,593,389 A | 6/1986 | Wurzburg et al. |
| 4,597,077 A | 6/1986 | Nelson et al. |
| 4,604,741 A | 8/1986 | Barsellotti |
| 4,608,686 A | 8/1986 | Barsellotti |
| 4,631,367 A | 12/1986 | Coviello et al. |
| 4,639,714 A | 1/1987 | Crowe |
| 4,642,607 A | 2/1987 | Strom et al. |
| 4,644,526 A | 2/1987 | Wu |
| 4,646,289 A | 2/1987 | Tsiakas et al. |
| 4,646,296 A | 2/1987 | Bartholet et al. |
| 4,649,551 A | 3/1987 | Sander et al. |
| 4,656,655 A | 4/1987 | Hashimoto |
| 4,665,516 A | 5/1987 | Middleton et al. |
| 4,670,870 A | 6/1987 | Hewinson et al. |
| 4,670,874 A | 6/1987 | Sato et al. |
| 4,672,602 A | 6/1987 | Hargrave et al. |
| 4,672,605 A | 6/1987 | Hustig et al. |
| 4,677,646 A | 6/1987 | Dodds et al. |
| 4,679,227 A | 7/1987 | Hughes-Hartogs |
| 4,691,344 A | 9/1987 | Brown et al. |
| 4,701,945 A | 10/1987 | Pedigo |
| 4,703,499 A | 10/1987 | Fossas et al. |
| 4,709,412 A | 11/1987 | Seymour et al. |
| 4,724,435 A | 2/1988 | Moses et al. |
| 4,731,821 A | 3/1988 | Jackson, III |
| 4,733,380 A | 3/1988 | Havira |
| 4,733,389 A | 3/1988 | Puvogel |
| 4,734,932 A | 3/1988 | Lott |
| 4,742,538 A | 5/1988 | Szlam |
| 4,754,326 A | 6/1988 | Kram et al. |
| 4,757,495 A | 7/1988 | Decker et al. |
| 4,757,497 A | 7/1988 | Beierle et al. |
| 4,761,646 A | 8/1988 | Choquet et al. |
| 4,764,922 A | 8/1988 | Dieter et al. |
| 4,766,402 A | 8/1988 | Crane |
| 4,768,110 A | 8/1988 | Dunlap et al. |
| 4,768,206 A | 8/1988 | Van Gerwen |
| 4,769,837 A | 9/1988 | McCormick et al. |
| 4,772,870 A | 9/1988 | Reyes |
| 4,776,006 A | 10/1988 | Comerford et al. |
| 4,780,757 A | 10/1988 | Bryer et al. |
| 4,780,758 A | 10/1988 | Lin et al. |
| 4,785,448 A | 11/1988 | Reichert et al. |
| 4,785,472 A | 11/1988 | Shapiro |
| 4,789,895 A | 12/1988 | Mustafa et al. |
| 4,789,994 A | 12/1988 | Randall et al. |
| 4,799,213 A | 1/1989 | Fitzgerald |
| 4,803,719 A | 2/1989 | Ulrich |
| 4,807,225 A | 2/1989 | Fitch |
| 4,815,106 A | 3/1989 | Propp et al. |
| 4,821,319 A | 4/1989 | Middleton et al. |
| 4,825,435 A | 4/1989 | Amundsen et al. |
| 4,829,570 A | 5/1989 | Schotz |
| 4,837,799 A | 6/1989 | Prohs et al. |
| 4,839,743 A | 6/1989 | Best et al. |
| 4,843,606 A | 6/1989 | Bux et al. |
| 4,847,903 A | 7/1989 | Schotz |
| 4,849,811 A | 7/1989 | Kleinerman |
| 4,866,602 A | 9/1989 | Hall |
| 4,866,704 A | 9/1989 | Bergman |
| 4,882,747 A | 11/1989 | Williams |
| 4,885,747 A | 12/1989 | Foglia |
| 4,885,766 A | 12/1989 | Yasuoka et al. |
| 4,888,795 A | 12/1989 | Ando et al. |

| Patent No. | Date | Name |
|---|---|---|
| 4,890,316 A | 12/1989 | Walsh et al. |
| 4,893,326 A | 1/1990 | Duran et al. |
| 4,901,342 A | 2/1990 | Jones |
| 4,918,688 A | 4/1990 | Krause et al. |
| 4,918,690 A | 4/1990 | Markkula, Jr. et al. |
| 4,924,492 A | 5/1990 | Gitlin et al. |
| 4,932,022 A | 6/1990 | Keeney et al. |
| 4,932,047 A | 6/1990 | Emmons et al. |
| 4,939,728 A | 7/1990 | Markkula, Jr. et al. |
| 4,945,404 A | 7/1990 | Miller |
| 4,947,483 A | 8/1990 | Dirr |
| 4,949,187 A | 8/1990 | Cohen |
| 4,953,160 A | 8/1990 | Gupta |
| 4,954,886 A | 9/1990 | Elberbaum |
| 4,955,048 A | 9/1990 | Iwamura et al. |
| 4,969,136 A | 11/1990 | Chamberlin et al. |
| 4,969,147 A | 11/1990 | Markkula, Jr. et al. |
| 4,973,954 A | 11/1990 | Schwarz |
| 4,975,896 A | 12/1990 | D'Agosto, III et al. |
| 4,975,906 A | 12/1990 | Takiyasu et al. |
| 4,979,028 A | 12/1990 | Minematsu et al. |
| 4,985,892 A | 1/1991 | Camarata |
| 4,989,081 A | 1/1991 | Miyagawa et al. |
| 4,996,709 A | 2/1991 | Heep et al. |
| 5,010,399 A | 4/1991 | Goodman et al. |
| 5,014,308 A | 5/1991 | Fox |
| 5,018,138 A | 5/1991 | Twitty et al. |
| 5,022,069 A | 6/1991 | Chen |
| 5,023,868 A | 6/1991 | Davidson et al. |
| 5,027,426 A | 6/1991 | Chiocca, Jr. |
| 5,032,819 A | 7/1991 | Sakuragi et al. |
| 5,033,062 A | 7/1991 | Morrow et al. |
| 5,034,883 A | 7/1991 | Donaldson et al. |
| 5,036,513 A | 7/1991 | Greenblatt |
| 5,051,822 A | 9/1991 | Rhoades |
| 5,065,133 A | 11/1991 | Howard |
| 5,070,522 A | 12/1991 | Nilssen |
| 5,089,886 A | 2/1992 | Grandmougin |
| 5,090,052 A | 2/1992 | Nakajima et al. |
| 5,095,497 A | 3/1992 | Aman et al. |
| 5,113,498 A | 5/1992 | Evan et al. |
| 5,125,077 A | 6/1992 | Hall |
| 5,144,544 A | 9/1992 | Jenneve et al. |
| 5,148,144 A | 9/1992 | Sutterlin et al. |
| 5,157,711 A | 10/1992 | Shimanuki |
| 5,175,764 A | 12/1992 | Patel et al. |
| 5,181,240 A | 1/1993 | Sakuragi et al. |
| 5,210,788 A | 5/1993 | Nilssen |
| 5,216,704 A | 6/1993 | Williams et al. |
| 5,220,597 A | 6/1993 | Horiuchi |
| 5,224,154 A | 6/1993 | Aldridge et al. |
| 5,247,347 A | 9/1993 | Litteral et al. |
| 5,255,267 A | 10/1993 | Hansen et al. |
| 5,257,006 A | 10/1993 | Graham et al. |
| 5,283,637 A | 2/1994 | Goolcharan |
| 5,289,359 A | 2/1994 | Ziermann |
| 5,319,634 A | 6/1994 | Bartholomew et al. |
| 5,323,461 A | 6/1994 | Rosenbaum et al. |
| 5,341,415 A | 8/1994 | Baran |
| 5,343,514 A | 8/1994 | Snyder |
| 5,347,549 A | 9/1994 | Baumann |
| 5,351,272 A | 9/1994 | Abraham |
| 5,353,334 A | 10/1994 | O'Sullivan |
| 5,363,432 A | 11/1994 | Martin et al. |
| 5,379,005 A | 1/1995 | Aden et al. |
| 5,391,932 A | 2/1995 | Small et al. |
| 5,406,260 A | 4/1995 | Cummings et al. |
| 5,408,260 A | 4/1995 | Arnon |
| 5,410,343 A | 4/1995 | Coddington et al. |
| 5,420,578 A | 5/1995 | O'Brien et al. |
| 5,420,886 A | 5/1995 | Ohmori |
| 5,424,710 A | 6/1995 | Baumann |
| 5,428,682 A | 6/1995 | Apfel |
| 5,440,335 A | 8/1995 | Beveridge |
| 5,448,635 A | 9/1995 | Biehl et al. |
| 5,452,289 A | 9/1995 | Sharma et al. |
| 5,454,008 A | 9/1995 | Baumann et al. |
| 5,461,671 A | 10/1995 | Sakuragi et al. |
| 5,463,616 A | 10/1995 | Kruse et al. |
| 5,475,687 A | 12/1995 | Markkula, Jr. et al. |
| 5,483,574 A | 1/1996 | Yuyama |
| 5,530,737 A | 6/1996 | Bartholomew et al. |
| 5,530,748 A | 6/1996 | Ohmori |
| 5,533,101 A | 7/1996 | Miyagawa |
| 5,539,805 A | 7/1996 | Bushue et al. |
| 5,544,243 A | 8/1996 | Papadopoulos |
| 5,546,385 A | 8/1996 | Caspi et al. |
| 5,548,592 A | 8/1996 | Komarek et al. |
| 5,548,614 A | 8/1996 | Stoll et al. |
| 5,550,836 A | 8/1996 | Albrecht et al. |
| 5,553,063 A | 9/1996 | Dickson |
| 5,553,138 A | 9/1996 | Heald et al. |
| 5,566,233 A | 10/1996 | Liu |
| 5,568,547 A | 10/1996 | Nishimura |
| 5,570,085 A | 10/1996 | Bertsch |
| 5,574,748 A | 11/1996 | Vander Mey et al. |
| 5,581,555 A | 12/1996 | Dubberly et al. |
| 5,583,934 A | 12/1996 | Zhou |
| 5,587,692 A | 12/1996 | Graham et al. |
| 5,592,540 A | 1/1997 | Beveridge |
| 5,596,631 A | 1/1997 | Chen |
| 5,599,206 A | 2/1997 | Slack et al. |
| 5,604,737 A | 2/1997 | Iwami et al. |
| 5,604,791 A | 2/1997 | Lee |
| 5,608,792 A | 3/1997 | Laidler |
| 5,610,916 A | 3/1997 | Kostreski et al. |
| 5,619,252 A | 4/1997 | Nakano |
| 5,621,455 A | 4/1997 | Rogers et al. |
| 5,623,537 A | 4/1997 | Ensor et al. |
| 5,625,863 A | 4/1997 | Abraham |
| 5,627,827 A | 5/1997 | Dale et al. |
| 5,646,983 A | 7/1997 | Suffern et al. |
| 5,651,696 A | 7/1997 | Jennison |
| 5,659,608 A | 8/1997 | Stiefel |
| 5,675,375 A | 10/1997 | Riffee |
| 5,682,423 A | 10/1997 | Walker |
| 5,684,826 A | 11/1997 | Ratner |
| 5,696,790 A | 12/1997 | Graham et al. |
| 5,705,974 A | 1/1998 | Patel et al. |
| 5,706,007 A | 1/1998 | Fragnito et al. |
| 5,706,157 A | 1/1998 | Galecki et al. |
| 5,708,701 A | 1/1998 | Houvig et al. |
| 5,729,824 A | 3/1998 | O'Neill et al. |
| 5,742,527 A | 4/1998 | Rybicki et al. |
| 5,742,596 A | 4/1998 | Baratz et al. |
| 5,748,634 A | 5/1998 | Sokol et al. |
| 5,757,803 A | 5/1998 | Russell et al. |
| 5,757,936 A | 5/1998 | Lee |
| 5,764,743 A | 6/1998 | Goedken et al. |
| 5,774,526 A | 6/1998 | Propp et al. |
| 5,778,303 A | 7/1998 | Shinozaki et al. |
| 5,787,115 A | 7/1998 | Turnbull et al. |
| 5,799,069 A | 8/1998 | Weston et al. |
| 5,802,283 A | 9/1998 | Grady et al. |
| 5,805,053 A | 9/1998 | Patel et al. |
| 5,805,591 A | 9/1998 | Naboulsi et al. |
| 5,812,786 A | 9/1998 | Seazholtz et al. |
| 5,815,681 A | 9/1998 | Kikinis |
| 5,818,710 A | 10/1998 | LeVan Suu |
| 5,818,821 A | 10/1998 | Schurig |
| 5,822,678 A | 10/1998 | Evanyk |
| 5,826,196 A | 10/1998 | Cuthrell |
| 5,835,005 A | 11/1998 | Furukawa et al. |
| 5,838,777 A | 11/1998 | Chang et al. |
| 5,841,360 A | 11/1998 | Binder |
| 5,841,840 A | 11/1998 | Smith et al. |

| | | | |
|---|---|---|---|
| 5,841,841 A | 11/1998 | Dodds et al. | |
| 5,842,032 A | 11/1998 | Bertsch | |
| 5,842,111 A | 11/1998 | Byers | |
| 5,844,888 A | 12/1998 | Markkula et al. | |
| 5,848,150 A | 12/1998 | Bingel | |
| D404,721 S | 1/1999 | Messer | |
| D405,422 S | 2/1999 | Law et al. | |
| 5,878,047 A | 3/1999 | Ganek et al. | |
| 5,878,133 A | 3/1999 | Zhou et al. | |
| 5,884,086 A | 3/1999 | Amoni et al. | |
| 5,889,856 A | 3/1999 | O'Toole et al. | |
| 5,892,764 A | 4/1999 | Riemann et al. | |
| 5,892,792 A | 4/1999 | Walley | |
| 5,896,443 A | 4/1999 | Dichter | |
| 5,896,556 A | 4/1999 | Moreland et al. | |
| 5,903,213 A | 5/1999 | Hodge et al. | |
| 5,903,643 A | 5/1999 | Bruhnke | |
| 5,905,786 A | 5/1999 | Hoopes | |
| 5,911,119 A | 6/1999 | Bartholomew et al. | |
| 5,912,895 A | 6/1999 | Terry et al. | |
| 5,930,340 A * | 7/1999 | Bell | 379/93.08 |
| 5,937,055 A | 8/1999 | Kaplan | |
| 5,938,757 A | 8/1999 | Bertsch | |
| 5,940,400 A | 8/1999 | Eastmond et al. | |
| 5,940,479 A | 8/1999 | Guy et al. | |
| 5,943,404 A | 8/1999 | Sansom et al. | |
| 5,949,476 A | 9/1999 | Pocock et al. | |
| 5,960,066 A * | 9/1999 | Hartmann et al. | 379/93.08 |
| 5,963,539 A | 10/1999 | Webber, Jr. et al. | |
| 5,963,595 A | 10/1999 | Graham et al. | |
| 5,970,127 A | 10/1999 | Smith et al. | |
| 5,982,784 A | 11/1999 | Bell | |
| 5,982,854 A | 11/1999 | Ehreth | |
| 5,994,998 A | 11/1999 | Fisher et al. | |
| 5,995,598 A | 11/1999 | Berstis | |
| 6,002,722 A | 12/1999 | Wu | |
| 6,005,873 A | 12/1999 | Amit | |
| 6,011,794 A | 1/2000 | Mordowitz et al. | |
| 6,026,150 A | 2/2000 | Frank et al. | |
| 6,029,047 A | 2/2000 | Ishida et al. | |
| 6,038,425 A | 3/2000 | Jeffrey | |
| 6,047,055 A | 4/2000 | Carkner et al. | |
| 6,052,380 A | 4/2000 | Bell | |
| 6,055,435 A | 4/2000 | Smith et al. | |
| 6,061,357 A | 5/2000 | Olshansky et al. | |
| 6,061,392 A | 5/2000 | Bremer et al. | |
| 6,069,899 A | 5/2000 | Foley | |
| 6,087,860 A | 7/2000 | Liu et al. | |
| 6,088,368 A | 7/2000 | Rubinstain et al. | |
| 6,094,441 A | 7/2000 | Jung et al. | |
| 6,097,801 A | 8/2000 | Williams et al. | |
| 6,101,341 A | 8/2000 | Manabe | |
| 6,107,912 A | 8/2000 | Bullock et al. | |
| 6,108,330 A | 8/2000 | Bhatia et al. | |
| 6,111,764 A | 8/2000 | Atou et al. | |
| 6,115,468 A | 9/2000 | De Nicolo | |
| 6,115,755 A | 9/2000 | Krishan | |
| 6,128,471 A | 10/2000 | Quelch et al. | |
| 6,130,893 A | 10/2000 | Whittaker et al. | |
| 6,130,896 A | 10/2000 | Lueker et al. | |
| 6,134,235 A | 10/2000 | Goldman et al. | |
| 6,134,308 A | 10/2000 | Fallon et al. | |
| 6,137,865 A * | 10/2000 | Ripy et al. | 379/93.05 |
| 6,141,356 A | 10/2000 | Gorman | |
| 6,144,399 A | 11/2000 | Manchester et al. | |
| 6,151,480 A | 11/2000 | Fischer et al. | |
| 6,154,465 A | 11/2000 | Pickett | |
| 6,157,716 A | 12/2000 | Ortel | |
| 6,160,880 A | 12/2000 | Allen | |
| 6,167,043 A | 12/2000 | Frantz | |
| 6,169,795 B1 | 1/2001 | Dunn et al. | |
| 6,175,860 B1 | 1/2001 | Gaucher | |
| 6,192,399 B1 | 2/2001 | Goodman | |
| 6,202,211 B1 | 3/2001 | Williams, Jr. | |
| 6,208,637 B1 | 3/2001 | Eames | |
| 6,212,227 B1 | 4/2001 | Ko et al. | |
| 6,212,274 B1 | 4/2001 | Ninh | |
| 6,215,789 B1 | 4/2001 | Keenan et al. | |
| 6,216,160 B1 | 4/2001 | Dichter | |
| 6,218,930 B1 | 4/2001 | Katzenberg et al. | |
| 6,227,499 B1 | 5/2001 | Jennison et al. | |
| 6,236,653 B1 | 5/2001 | Dalton et al. | |
| 6,236,664 B1 | 5/2001 | Erreygers | |
| 6,240,166 B1 | 5/2001 | Collin et al. | |
| 6,243,571 B1 | 6/2001 | Bullock et al. | |
| 6,246,748 B1 | 6/2001 | Yano | |
| 6,252,957 B1 | 6/2001 | Jauregui et al. | |
| 6,256,518 B1 | 7/2001 | Buhrmann | |
| 6,259,775 B1 | 7/2001 | Alpert et al. | |
| 6,282,238 B1 | 8/2001 | Landry | |
| 6,282,277 B1 | 8/2001 | DeBalko | |
| 6,285,754 B1 | 9/2001 | Sun et al. | |
| 6,292,467 B1 | 9/2001 | Keller | |
| 6,292,517 B1 | 9/2001 | Jeffress et al. | |
| 6,295,356 B1 | 9/2001 | De Nicolo | |
| 6,310,894 B1 | 10/2001 | Counterman | |
| 6,317,884 B1 | 11/2001 | Eames et al. | |
| 6,320,866 B2 | 11/2001 | Wolf et al. | |
| 6,320,900 B1 | 11/2001 | Liu | |
| 6,324,268 B1 | 11/2001 | Balachandran et al. | |
| 6,349,133 B1 | 2/2002 | Matthews et al. | |
| 6,356,562 B1 | 3/2002 | Bamba | |
| 6,370,149 B1 | 4/2002 | Gorman et al. | |
| 6,389,125 B1 | 5/2002 | Ubowski | |
| 6,393,050 B1 | 5/2002 | Liu | |
| 6,396,391 B1 | 5/2002 | Binder | |
| 6,396,393 B2 | 5/2002 | Yuasa | |
| 6,404,773 B1 | 6/2002 | Williams et al. | |
| 6,414,952 B2 | 7/2002 | Foley | |
| 6,424,661 B1 | 7/2002 | Bentley | |
| 6,427,237 B1 | 7/2002 | Aranguren et al. | |
| 6,430,199 B1 | 8/2002 | Kerpez | |
| 6,433,672 B1 | 8/2002 | Shirmard | |
| 6,434,123 B1 | 8/2002 | Park | |
| 6,449,318 B1 | 9/2002 | Rumbaugh | |
| 6,449,348 B1 | 9/2002 | Lamb et al. | |
| 6,470,053 B1 | 10/2002 | Liu | |
| 6,473,495 B1 | 10/2002 | Willer | |
| 6,473,608 B1 | 10/2002 | Lehr et al. | |
| 6,480,510 B1 | 11/2002 | Binder | |
| 6,483,902 B1 | 11/2002 | Stewart et al. | |
| 6,493,325 B1 | 12/2002 | Hjalmtysson et al. | |
| 6,493,875 B1 | 12/2002 | Eames et al. | |
| 6,507,647 B1 | 1/2003 | Mandalia | |
| 6,510,204 B2 | 1/2003 | De Clercq et al. | |
| 6,522,662 B1 | 2/2003 | Liu | |
| 6,522,728 B1 * | 2/2003 | Willer | 379/90.01 |
| 6,522,730 B1 | 2/2003 | Timm et al. | |
| 6,522,731 B2 | 2/2003 | Matsumoto | |
| 6,526,581 B1 | 2/2003 | Edson | |
| 6,532,279 B1 | 3/2003 | Goodman | |
| 6,532,280 B1 | 3/2003 | McDonald | |
| 6,535,587 B1 | 3/2003 | Kobayashi | |
| 6,539,011 B1 | 3/2003 | Keenan et al. | |
| 6,549,616 B1 * | 4/2003 | Binder | 379/90.01 |
| 6,556,564 B2 | 4/2003 | Rogers | |
| 6,556,581 B1 | 4/2003 | He et al. | |
| 6,560,319 B1 | 5/2003 | Binder | |
| 6,560,333 B1 | 5/2003 | Consiglio et al. | |
| 6,563,816 B1 | 5/2003 | Nodoushani et al. | |
| 6,567,981 B1 | 5/2003 | Jeffrey | |
| 6,570,869 B1 | 5/2003 | Shankar et al. | |
| 6,570,890 B1 | 5/2003 | Keenan et al. | |
| 6,572,384 B1 | 6/2003 | Marchevsky | |
| 6,574,242 B1 | 6/2003 | Keenan et al. | |
| 6,574,313 B1 | 6/2003 | Chea, Jr. et al. | |

| Patent | Type | Date | Inventor |
|---|---|---|---|
| 6,577,631 | B1 | 6/2003 | Keenan et al. |
| 6,577,882 | B1 | 6/2003 | Roos |
| 6,580,254 | B2 | 6/2003 | Schofield |
| 6,580,710 | B1 | 6/2003 | Bowen et al. |
| 6,580,785 | B2 | 6/2003 | Bremer et al. |
| 6,584,122 | B1 | 6/2003 | Matthews et al. |
| 6,584,148 | B1 | 6/2003 | Zitting et al. |
| 6,584,197 | B1 | 6/2003 | Boudreaux, Jr. et al. |
| 6,587,454 | B1 | 7/2003 | Lamb |
| 6,587,473 | B2 | 7/2003 | Terry et al. |
| 6,587,479 | B1 | 7/2003 | Bianchi et al. |
| 6,587,560 | B1 | 7/2003 | Scott et al. |
| 6,603,808 | B1 | 8/2003 | Anne et al. |
| 6,640,308 | B1 | 10/2003 | Keyghobad et al. |
| 6,643,566 | B1 | 11/2003 | Lehr et al. |
| 6,650,622 | B1 | 11/2003 | Austerman, III et al. |
| 6,653,932 | B1 | 11/2003 | Walley et al. |
| 6,657,994 | B1 | 12/2003 | Rajakarunanayake |
| 6,658,098 | B2 | 12/2003 | Lamb et al. |
| 6,658,108 | B1 | 12/2003 | Bissell et al. |
| 6,665,404 | B2 | 12/2003 | Cohen |
| 6,678,321 | B1 | 1/2004 | Graham et al. |
| 6,678,721 | B1 | 1/2004 | Bell |
| 6,681,013 | B1 | 1/2004 | Miyamoto |
| 6,686,832 | B2 | 2/2004 | Abraham |
| 6,690,677 | B1 * | 2/2004 | Binder .................... 379/90.01 |
| 6,690,792 | B1 | 2/2004 | Robinson et al. |
| 6,693,916 | B1 | 2/2004 | Chaplik et al. |
| 6,697,358 | B2 | 2/2004 | Bernstein |
| 6,700,970 | B1 | 3/2004 | Aronson et al. |
| 6,701,406 | B1 | 3/2004 | Chang et al. |
| 6,704,414 | B2 | 3/2004 | Murakoshi |
| 6,710,704 | B2 | 3/2004 | Fisher et al. |
| 6,711,138 | B1 | 3/2004 | Pai et al. |
| 6,721,365 | B1 | 4/2004 | Yin et al. |
| 6,721,419 | B1 | 4/2004 | Stell et al. |
| 6,721,790 | B1 | 4/2004 | Chen |
| 6,731,627 | B1 | 5/2004 | Gupta et al. |
| 6,732,315 | B2 | 5/2004 | Yagil et al. |
| 6,732,368 | B1 | 5/2004 | Michael et al. |
| 6,735,217 | B1 | 5/2004 | Webber, Jr. et al. |
| 6,738,382 | B1 | 5/2004 | West et al. |
| 6,738,470 | B1 | 5/2004 | Aronovitz |
| 6,738,597 | B1 | 5/2004 | Jeung et al. |
| 6,744,883 | B1 * | 6/2004 | Bingel et al. ............. 379/93.05 |
| 6,747,995 | B1 | 6/2004 | Brown et al. |
| 6,748,078 | B1 | 6/2004 | Posthuma |
| 6,754,186 | B1 | 6/2004 | Bullman |
| 6,759,946 | B2 | 7/2004 | Sahinoglu et al. |
| 6,763,097 | B1 | 7/2004 | Vitenberg |
| 6,763,109 | B1 | 7/2004 | Hoskins |
| 6,771,750 | B1 | 8/2004 | Nayler et al. |
| 6,771,773 | B1 | 8/2004 | Hanrieder et al. |
| 6,771,774 | B1 | 8/2004 | Phan et al. |
| 6,773,632 | B1 | 8/2004 | Marshall et al. |
| 6,775,299 | B1 | 8/2004 | Olson et al. |
| 6,778,549 | B1 | 8/2004 | Keller |
| 6,778,646 | B1 | 8/2004 | Sun |
| 6,778,817 | B1 | 8/2004 | Bullock et al. |
| 6,785,296 | B1 | 8/2004 | Bell |
| 6,788,782 | B1 | 9/2004 | Fotsch et al. |
| 6,792,323 | B2 | 9/2004 | Krzyzanowski et al. |
| 6,795,539 | B2 | 9/2004 | Culli et al. |
| 6,798,767 | B1 | 9/2004 | Alexande et al. |
| 6,815,844 | B2 | 11/2004 | Kovarik |
| 6,819,760 | B1 | 11/2004 | Nayler |
| 6,823,047 | B1 | 11/2004 | Cruickshank |
| 6,831,975 | B1 | 12/2004 | Easwaran et al. |
| 6,831,976 | B1 | 12/2004 | Comerford et al. |
| 6,834,057 | B1 | 12/2004 | Rabenko et al. |
| 6,836,546 | B1 | 12/2004 | Willer |
| 6,839,345 | B2 | 1/2005 | Lu et al. |
| 6,842,459 | B1 | 1/2005 | Binder |
| 6,847,718 | B1 | 1/2005 | Hiraoka |
| 6,856,799 | B1 | 2/2005 | Ritter |
| 6,862,353 | B2 | 3/2005 | Rabenko et al. |
| 6,865,193 | B2 | 3/2005 | Terk |
| 6,868,072 | B1 | 3/2005 | Lin et al. |
| 6,868,081 | B1 | 3/2005 | Akram et al. |
| 6,876,648 | B1 | 4/2005 | Lee |
| 6,882,714 | B2 | 4/2005 | Mansfield |
| 6,898,413 | B2 | 5/2005 | Yip et al. |
| 6,904,134 | B2 | 6/2005 | Jeon et al. |
| 6,909,725 | B1 | 6/2005 | Chow |
| 6,912,209 | B1 | 6/2005 | Thi et al. |
| 6,917,681 | B2 | 7/2005 | Robinson et al. |
| 6,922,407 | B2 | 7/2005 | Wu |
| 6,925,089 | B2 | 8/2005 | Chow et al. |
| 6,934,754 | B2 | 8/2005 | West et al. |
| 6,937,056 | B2 | 8/2005 | Binder |
| 6,941,364 | B2 | 9/2005 | Kim et al. |
| 6,947,736 | B2 | 9/2005 | Shaver et al. |
| 6,956,826 | B1 | 10/2005 | Binder |
| 6,961,303 | B1 | 11/2005 | Binder |
| 6,963,559 | B2 | 11/2005 | Elo |
| 6,970,538 | B2 * | 11/2005 | Binder .................... 379/90.01 |
| 6,973,394 | B2 | 12/2005 | Jaeger et al. |
| 6,975,713 | B1 | 12/2005 | Smith et al. |
| 6,980,638 | B1 | 12/2005 | Smith et al. |
| 6,985,714 | B2 | 1/2006 | Akiyama et al. |
| 6,989,733 | B2 | 1/2006 | Simonsen et al. |
| 6,996,213 | B1 | 2/2006 | De Jong |
| 6,996,729 | B2 | 2/2006 | Volkening et al. |
| 6,998,964 | B2 | 2/2006 | Lomax, Jr. et al. |
| 7,002,898 | B1 | 2/2006 | Lou |
| 7,003,102 | B2 | 2/2006 | Kiko |
| 7,006,523 | B2 | 2/2006 | Binder |
| 7,009,946 | B1 | 3/2006 | Kardach |
| 7,016,377 | B1 | 3/2006 | Chun et al. |
| 7,027,566 | B2 | 4/2006 | Bossemeyer, Jr. et al. |
| 7,035,270 | B2 | 4/2006 | Moore, Jr. et al. |
| 7,053,501 | B1 | 5/2006 | Barrass |
| 7,054,303 | B2 | 5/2006 | Miyazaki et al. |
| 7,058,174 | B2 | 6/2006 | Posthuma |
| 7,068,668 | B2 | 6/2006 | Feuer |
| 7,079,647 | B2 | 7/2006 | Tomobe |
| 7,082,141 | B2 | 7/2006 | Sharma et al. |
| 7,095,848 | B1 | 8/2006 | Fischer et al. |
| 7,095,849 | B2 | 8/2006 | Smith et al. |
| 7,099,368 | B2 | 8/2006 | Santhoff et al. |
| 7,099,707 | B2 | 8/2006 | Amin et al. |
| 7,106,721 | B1 | 9/2006 | Binder |
| 7,113,574 | B1 | 9/2006 | Haas et al. |
| 7,142,560 | B1 | 11/2006 | Mansfield |
| 7,142,563 | B1 | 11/2006 | Lin |
| 7,142,934 | B2 | 11/2006 | Janik |
| 7,149,182 | B1 | 12/2006 | Renucci et al. |
| 7,149,474 | B1 | 12/2006 | Mikhak |
| 7,154,996 | B2 | 12/2006 | Strauss |
| 7,162,013 | B2 | 1/2007 | Gavette et al. |
| 7,171,506 | B2 | 1/2007 | Iwamura |
| 7,199,706 | B2 | 4/2007 | Dawson et al. |
| 7,206,322 | B1 | 4/2007 | Garg et al. |
| 7,206,417 | B2 | 4/2007 | Nathan |
| 7,209,719 | B2 | 4/2007 | Liebenow |
| 2001/0030950 | A1 | 10/2001 | Chen et al. |
| 2002/0006137 | A1 | 1/2002 | Rabenko et al. |
| 2002/0015489 | A1 | 2/2002 | Ben-David |
| 2002/0037004 | A1 | 3/2002 | Bossemeyer et al. |
| 2002/0057581 | A1 | 5/2002 | Nadav |
| 2002/0061012 | A1 | 5/2002 | Thi et al. |
| 2002/0076038 | A1 | 6/2002 | Barrese et al. |
| 2002/0110236 | A1 | 8/2002 | Karnad |
| 2002/0128009 | A1 | 9/2002 | Boch et al. |
| 2002/0144159 | A1 | 10/2002 | Wu et al. |
| 2002/0176567 | A1 | 11/2002 | Chen et al. |

| | | | |
|---|---|---|---|
| 2002/0180592 A1 | 12/2002 | Gromov | |
| 2002/0198952 A1 | 12/2002 | Bell | |
| 2003/0016794 A1 | 1/2003 | Brothers | |
| 2003/0058085 A1 | 3/2003 | Fisher et al. | |
| 2003/0061522 A1 | 3/2003 | Ke et al. | |
| 2003/0067910 A1 | 4/2003 | Razazian et al. | |
| 2003/0088706 A1 | 5/2003 | Chan et al. | |
| 2003/0099076 A1 | 5/2003 | Elkayam et al. | |
| 2003/0107269 A1 | 6/2003 | Jetzt | |
| 2003/0112965 A1 | 6/2003 | McNamera et al. | |
| 2003/0146765 A1 | 8/2003 | Darshan et al. | |
| 2003/0179869 A1* | 9/2003 | Yoshitani | 379/93.07 |
| 2003/0194912 A1 | 10/2003 | Ferentz | |
| 2003/0204393 A1 | 10/2003 | Czerwiec et al. | |
| 2003/0206623 A1 | 11/2003 | Deichstetter et al. | |
| 2003/0207697 A1 | 11/2003 | Shpak | |
| 2004/0006484 A1 | 1/2004 | Manis et al. | |
| 2004/0037317 A1 | 2/2004 | Zalitzky et al. | |
| 2004/0083262 A1 | 4/2004 | Trantow | |
| 2004/0090984 A1 | 5/2004 | Saint-Hilaire et al. | |
| 2004/0107299 A1 | 6/2004 | Lee et al. | |
| 2004/0136373 A1 | 7/2004 | Bareis | |
| 2004/0170262 A1 | 9/2004 | Ohno | |
| 2004/0177167 A1 | 9/2004 | Iwamura et al. | |
| 2004/0180573 A1 | 9/2004 | Chen | |
| 2004/0204040 A1 | 10/2004 | Heijnen | |
| 2004/0268160 A1 | 12/2004 | Atkinson et al. | |
| 2005/0015805 A1 | 1/2005 | Iwamura | |
| 2005/0038875 A1 | 2/2005 | Park | |
| 2005/0063403 A1 | 3/2005 | Binder | |
| 2005/0076149 A1 | 4/2005 | McKown et al. | |
| 2005/0083959 A1 | 4/2005 | Binder | |
| 2005/0086694 A1 | 4/2005 | Hicks et al. | |
| 2005/0114325 A1 | 5/2005 | Liu et al. | |
| 2005/0150100 A1 | 7/2005 | Merdan et al. | |
| 2005/0226200 A1 | 10/2005 | Askildsen et al. | |
| 2006/0056444 A1 | 3/2006 | Binder | |
| 2006/0140178 A1 | 6/2006 | Cheng et al. | |
| 2006/0153169 A1 | 7/2006 | Koifman et al. | |
| 2006/0193310 A1 | 8/2006 | Landry et al. | |
| 2006/0193313 A1 | 8/2006 | Landry et al. | |
| 2006/0203981 A1 | 9/2006 | Binder | |
| 2006/0215680 A1 | 9/2006 | Camagna | |
| 2006/0238250 A1 | 10/2006 | Camagna et al. | |
| 2006/0251094 A1 | 11/2006 | Van Vleck et al. | |
| 2006/0251159 A1 | 11/2006 | Huotari et al. | |
| 2006/0251179 A1 | 11/2006 | Ghoshal | |
| 2006/0280197 A1 | 12/2006 | Stone | |
| 2006/0291493 A1 | 12/2006 | Schley-May et al. | |

FOREIGN PATENT DOCUMENTS

| | | |
|---|---|---|
| WO | WO 96/23377 | 8/1996 |
| WO | WO 98/02985 | 1/1998 |
| WO | WO 99/03255 | 1/1999 |
| WO | WO 99/12330 | 3/1999 |
| WO | WO 01028215 | 4/2001 |

OTHER PUBLICATIONS

Olshansky, "A Full Service Network for the Copper Plant", Telephony, 1985, pp. 52-60.

Instant Network Rules on Phone LInes, Electronic Design, 1987.

O. Agazzi, et al., Large Scale Integration of Hybrid-Method Digital Subscriber Loops, IEEE Transactions on Communications, vol. COM-30, No. 9, Sep. 1982, pp. 2095-2108.

S.V. Ahamed, et al., "A tutorial on Two-Wire Digital Transmission in the Loop Plant", IEEE Transactions on Communications, vol. COM-29, No. 11, Nov. 1991, pp. 1554-1564.

J. Alves, "Data Over Voice—A Low Cost LAN Alternative", Communications Show and Conference, MECOM 87, Jan., pp. 13-15.

S.B. Andrews, "The Generic Digital Channel Concept", IEEE International Conference on Communications, 1985, Jun. 23-26, 1985, Chicago, IL, pp. 7.1.1-7.1.3.

G.W. Beene, "Design Considerations for a CO-Powered Distributed-Drop PCM Station Carrier", IEEE Transactions on Communications, vol. COM-30, No. 9, Sep. 1982, pp. 2022-2028.

A. Bienz, "1+1=1—Order Das Telefonnetz Als Datennetz", Sysdata, vol. 16, Aug. 28, 1985, pp. 41-42.

A. Brosio, et al., "A Comparison of Digital Subscriber Line Transmission Systems Employing Different Line Codes", IEEE Transactions on Communications, vol. COM-29, No. 11, Nov. 1981, pp. 1581-1588.

T.P. Byrne, et al., "Positioning the Subscriber Loop Network for Digital Services", IEEE Transactions on Communications, vol. COM-30, No. 9, Sep. 1982, pp. 2006-2011.

R.G. Cornell, et al., "Progress Towards Digital Subscriber Line Services and Signaling", IEEE Transactions on Communications, vol. COM-29, No. 11, Nov. 1981, pp. 1589-1594.

S. Davis, "Integrating Voice and Data: A Marriage of Convenience", Today's Office, vol. 24, No. 9, Feb. 1990, pp. 28-30.

M. Devault, et al., "Resaux Domestiques et Terminaux Audiovisuels Numeriques", L'Echo Des Recherches, No. 126, 1986, pp. 37-46.

H. Fuchs, et al., "Providing Full Duplex Transmission Over Two-Wire Subscriber Loops", Telephony, vol. 208, No. 11, Mar. 18, 1985, pp. 76, 77, 78 and 84.

H. Fukagawa, et al., "Bus Wiring System for Residences", Matsushita Electric Works Technical Report, No. 36, Feb. 1988, pp. 31-35.

D. Glick, et al., "Providing Telco Customers Continuous Data Services", Telephony, vol. 205, No. 22, Nov. 1983, pp. 46, 50, 51, 54.

J.B. Hughes, et al., "A Receiver IC for a 1+1 Digital Subscriber Loop", IEEE Journal of Solid State Circuitry, vol. S.C. 20, No. 3, Jun. 1985 pp. 671-678.

R. Jelski, "Subscriber Subcarrier System—A New Life," Communications International, vol. 4, No. 5, May 1977, pp. 29-30.

A.J. Karia, et al., "A Digital Subscriber Carrier System for the Evolving Subscriber Loop Network", IEEE Transactions on Communications, vol. COM-30, No. 9, Sep. 1982, pp. 2012, 2014, 2015.

T. Masuda, et al., "2-Wire Video Intercom System with Telephone", National Technical Report, vol. 37, No. 6, Dec. 1991, pp. 74-80.

T. Matthews, "Telecomm System is Nerve Center", Infosystems, vol. 31, No. 5, May 1984, pp. 68-69.

J. K. Merrow, "A New Approach to Integrating Local Area Data and Voice Transmission," Telephony, vol. 250, No. 17, Oct. 1983, 2 pages.

H. Morgan, "Two-Wire Full-Duplex Modem Simplifies Voice and Data Networking", Mini-Micro Systems, vol. 17, No. 3, Mar. 1984, 4 pages.

R. Murakoshi, "Home Automation", Journal of the Society of Instrument and Control Engineers, vol. 23, No. 11, Nov. 1984, pp. 955-958.

R.D. Nash, et al., "Simultaneous Transmission of Speech and Data Over An Analog Telephone Channel", GLOBECOM '85. IEEE Global Telecommunications Conference. Conference Record. Communication Technology to Provide New Services, Dec. 25, 1985, New Orleans, Louisiana, pp. 4.2.1-4.2.4.

H. Ogiwara, et al., Design Philosophy and Hardware Implementation for Digital Subscriber Loops, IEEE Transactions on Communications, vol. COM-30, No. 9, Sep. 1982, pp. 2057-2065.

J.L. Pernin, "Related Evolution of Subscriber Loop Plant and Residential Data Transmission Needs", Intelcon 79 Exposition Proceedings, Feb. 26-Mar. 2, 1979, Dallas, Texas, pp. 596-599.

R.A. Tatum, "Project Victoria—the 7-in-1 Solution", Telephone Engineer and Management, vol. 90, No. 1, Jan. 1, 1986, pp. 47 and 50.

A. Teshima, et al., "Still Video Telecommunication Over the Analog Telephone Network", Journal of the Institute of Television Engineers of Japan, vol. 42, No. 11, Nov. 1988, pp. 1162-1167.

S.R. Treves, et al., "Text, Image and Data Integration in a Distributed Control Digital Voice Switching System", International Switching Symposium—ISS '81 CIC, Sep. 21-25, 1981, Montreal, Quebec, Canada, pp. 1-7.

T. Tsuda, et al., "Experimental In-House Multiservice Communication System", Fujitsu Scientific and Technical Journal, vol. 16, No. 3, Sep. 1980, pp. 29-45.

K. Urui, "Integrated Voice/Data Digital EPBX", Toshiba Review, No. 150, Winter 1984, pp. 30-33.

A.F. Van Den Berg, et al., "Principles van de Modem: Technieken en Specificaties", Elektronica, vol. 32, No. 5, Mar. 9, 1984, pp. 11, 13, 15, 17, 19 and 21.
M.G. Vry, et al., "Digital 1+1 Systems for Local Network Enhancement", Conference on Communications Equipment and Systems, Apr. 20-22, 1982, Birmingham, United Kingdom, pp. 61-64.
M.G. Vry, et al., "The Design of a 1+1 System for Digital Signal Transmission to the Subscriber", NTG-Bachberichte, vol. 73, 1980, pp. 36-40.
J.A. Webb, "A New Concept in Data-Above-Voice (DAV)", PTC '86: Evolutions of the Digital Pacific. Telecommunications—Asia, Americas, Pacific: PTC '86 Proceedings, Jan. 12-15, 1986, Honolulu, Hawaii, pp. 260-265.
K. Yamamoto, "A Home Terminal System Using the Home Area Information Network", IEEE Transactions on Consumer Electronics, vol. CE-30, No. 4, Nov. 1984, pp. 608-616.
"Centrex LAN Can Provide Advanced Network Capabilities Over the Existing Telephone Wires", Communications News, vol. 25, No. 6, Jun. 1988, p. 27.
"Data Over Voice is Solution for Corporate Network", Telephone Engineer and Management, vol. 91, No. 9, May 1, 1987, pp. 67-69.
"Data Carrier System Allows Simultaneous Voice/Data Transmission for PABX Telephone Systems", Computer Design, vol. 21, No. 5, May 1982, pp. 68 and 70.
"Computerized Telephone System Integrates Voice and Data Switching", Computer Design, vol. 20, No. 4, Apr. 1981, 6 pages.
"AT&T's Systemax Premises Distribution System Solves Networking Problems", Fiber Optics Magazine, vol. 12, No. 4, Jul.-Aug. 1990, pp. 14-16.
M.M. Anderson, "Video Services on Copper", Conference: ICC 91, International Conference on Communications Conference Record, Jun. 2-26, 1991, Denver, CO, pp. 302-306.
M. Bastian, "Voice-Data Integration: An Architecture Perspective," IEEE Communications Magazine, vol. 24, No. 7, Jul. 1986, pp. 8-12.
M. Boubekker, "Bandwidth Reduction for the Transmission of Sign Language Over Telephone Lines", Proceedings of the SPIE-The International Society for Optical Engineering, vol. 1001, Part. 1, 1988, pp. 223-230.
S. Bramblett, "Connect Terminals to Your CPU Over PBX Telephone Lines", EDN, vol. 31, No. 5, Mar. 6, 1986, pp. 239-243, 245, 246 and 248.
G.D. Carse, "New and Future Technologies in the Local Telephone Network: The Victoria System", Conference: IEEE International Conference on Communications '86, ICC '86: Integrating the World Through Communications Conference Record, Jun. 22-25, 1986, Toronto, Ontario, Canada, pp. 410-412.
D.G.J. Fanshawe, "Architures for Home Systems", Conference: IEEE Colloquium on Home Systems-Information, Entertainment and Control, Oct. 1, 1990, London, United Kingdom, pp. 3/1-3/3.
M. Inoue, et al., "A Home Automation System", IEEE Transactions on Consumer Electronics, vol. CE-31, No. 3, Aug. 1985, pp. 516-527.
S. Motoyama, et al., "A Subscriber Loop Multiplexing System for Integrated Service Digital Networks", Conference: NTC '81, IEEE 1981 National Telecommunications Conference, Innovative Telecommunications-Key to the Future, Nov. 29-Dec. 3, 1981, New Orleans, Louisiana, pp. D5.1.1-D2.1.5.
G. Neumann, Flexible and Cost-Minimising System Concept (Ericsson Digital PABX MD 110), NET Nechrichten Elektronik-Telematik, Special Issue, Mar. 1988, pp. 11, 12, 14 and 15.
A. Pietrasik, et al., "Subscriber Carrier Telephony System 1+1", Wiadomosci Telekomunikacyjne, vol. 17, No. 7-8, Jul.-Aug. 1977, pp. 183-198.
V. Punj, "Broadband Applications and Services of Public Switched Networks", IEEE Transactions on Consumer Electronics, vol. 35, No. 2, May 1989, pp. 106-112.
T. Sodeyama, et al., "Intelligent House", Journal of the Institute of Electronics, Information and Communication Engineers, vol. 72, No. 9, Sep. 1989, pp. 1024-1026.
H. Tanaka, et al., "Telecontrol System VJ-501", National Technical Report, vol. 32, No. 6, Dec. 1986, pp. 809-817.
K. Yamamoto, et al., "New Home Telephone System Using Japanese Home Bus System Standard," IEEE Transactions on Consumer Electronics, vol. 35, No. 3, Aug. 1989, p. 687-697.

T. Yamazakli, et al., "Home Appliance Technologies," NEC Research and Development, No. 96, Mar. 1990, pp. 292-299.
Funkschau, "CEBus: US Households are Being Networked", No. 9, Apr. 1989, pp. 45-47.
"Shared Services (Data/Voice Network)", Communications News, vol. 25, No. 11, Nov. 1988, pp. 46-47.
Freeman, "Telecommunication Transmission Handbook", 2.sup.nd Ed., Cover, 1981, pp. xi-xxvii, Chapter 3 (pp. 79-127), Chapter 5 (pp. 172-252), Chapter 6 (pp. 253-288).
A. Artom, et al., "The Possible Use Of Customer Loop For New Services During The Transition From Analogue To Digital", Revue F.I.T.C.E., Mar.-Apr. 1981, vol. 20, No. 2, pp. 50-56.
A. Artom, et al., "Medium-Term Prospects for New Servies to the Telephone Customers," Conference Record, Jun. 14-18, 1981, Int'l Conf. On Communications, Denver, CO., pp. 14.4.1-14.4-6.
Hoe-Young Noh, "Home Automation", Korea Information Science Society Review, Apr. 1989, vol. 7 No. 2, pp. 40-44, Republic of Korea. (Translation Provided).
Chow, et al., "A Multi-drop In-House ADSL Distribution Network"; IEEE 1994, pp. 456-460.
English Language Abstract for Japanese Patent 1-27358 (64-27358) Jan. 30, 1989.
Bellcore: Request For Information: Asymmetrical Digital Subscriber Line (ADSL) Systems That Support Simplex High-Bit-Rate Access and POTS In The Copper Loop Plant; Jun. 1991.
Introduction to the CEBus Standard; Revision Feb. 5, 1995 Draft Copy (19 pages).
Compaq to Ride The CEBus: by Mark Hachman, EBN Jan. 22, 1996 (1 page).
CEBus Router Testing: IEEE Transactions on Consumer Electronics Nov. 1991, vol. 37 No. 4 (8 pages).
Technical Report TR-001 ADSL Forum System Reference Model; May 1996 (6 pages).
DSLPipe User's Guide; by Ascend Communications, Jun. 3, 1997 (245 pages).
DSLPipe Reference Guide; by Ascend Communications, Jun. 2, 1997 (162 pages).
Ascend DSLPipe-S Features; Posted May 12, 1997 (2 pages).
Broadband Digital Subscriber Line—A Full Service Network for the Copper Plant; Telephony / Jun. 12, 1995, vol. 228 No. 24 (8 pages).
Commtek Intros Video over UTP; Communications Week, Feb. 10, 1992 (3 pages).
Aurelio Amodei, et al., "Increasing the Throughput of the HomePNA MAC Protocol, IEEE, Proceedings of the 29th Annual IEEE International Conference on Local Computer Networks (LCN '04), 8 Pages", Nov. 1, 2004, 8 pages(s), None. cited by other.
"Home Phoneline Networking Alliance", Interface Specification for HomePNA 2.0 10M8 Technology Link Layer Protocol, (Dec. 1, 1999), pp. 1-39.
"Home Phoneline Networking Alliance", Interface Specification for HomePNA 2.0 10M8 Technology, (Dec. 1, 1999), pp. 1-77.
Paola Bisaglia, et al., Receiver Architectures for HomePNA 2.0 , Hewlett Packard Laboratories, Bristol, U.K., Oct. 17, 2001.
Loh, L.; Ozturk, Y.; Quality of Support and Priority Management in HomePNA 2.0 Link Layer.quadrature..quadrature. Computers and Communication; Jun. 30-Jul. 3, 2003. (ISCC 2003). Proceedings. Eighth IEEE International Symposium; pp. 861-866 vol. 2.
Phoneline / HPNA / HomePNA Networks, http://www.homenethelp.com/web/howto/HomeNet-HPNA.asp (visited Jul. 29, 2003) (3 pages).
Anonymous, HomePNA Specification 1.0 Field Tests Status, Mar. 1999, Home Phoneline Networking Alliance, Inc, pp. 1-6.
Simple, High-Speed Ethernet Technology For The Home, White Paper, Home Phoneline Networking Alliance, Jun. 1998, pp. 1-11.
Information on Home PhoneLine Networking Alliance (Home PNA), dated Jun. 1998 and before.
M. Coronaro, et al., "Integrated Office Communication System," Electrical Communication, 1986, pp. 17-22, vol. 60, No. 1, FACE Research Center, Pomezia, Italy.
Lon Works LPI-10 Link Power Interface Module User's Guide; Echelon Corporation, 1995 (37 pages).
Lon Works LPT-10 Link Power Transceiver User's Guide Version 2.1; Echelon Corporation, 1995 (60 pages).

Lon Works Router User's Guide Revision 3; Echelon Corporation, 1995 (68 pages).

Using the Lon Works PLT-22 Power Line Transceiver in European Utility Application, Version 1; Echelon Corporation, 1996-1999 (118 pages).

PL3120/PL3150 Power Line Smart Transceiver Data Book, Version 2; Echelon Corporation, 1996-2005 (255 pages).

PL DSK 2.1 Power Line Smart Transceiver Development Support Kit User's Guide; Echelon Corporation, 2005-2006 (18 pages).

Introduction to Pyxos FT Platform; Echelon Corporation, 2007 (34 pages).

LTM-10A User's Guide, Revision 4; Echelon Corporation, 1995-2001 (46 pages).

Lon Works Twisted Pair Control Module, User's Guide Version 2; Echelon Corporation, 1992-1996 (50 pages).

AN1000EVK Evaluation Unit Manual, Draft 1.0; Adaptive Networks Inc., Document No. 04-3170-01-B Aug. 1996 (31 pages).

AN1000 Powerline Network Communications Chip Set, Adaptive Networks Inc., 1995 (56 pages).

From the Ether—Bob Metcalfe, 'Cheap, reliable net connections may be as close as an electrical socket'; by Bob Metcalfe Info World Feb. 10, 1997 vol. 19 Issue 6 (4 pages).

Lon Works Custom Node Development, Lon Works Engineering Bulletin; Echelon Corporation, Jan. 1995 (16 pages).

Building a Lon Talk-to-PLC Gateway, Lon Works Engineering Bulletin; Echelon Corporation, May 1994 (62 pages).

Lon Works 78kbps Self-Healing Ring Architecture, Lon Works Marketing Bulletin; Echelon Corporation, Aug. 1993 (6 pages).

Centralized Commercial Building Applications with the Lon Works PLT-21 Power Line Transceiver, Lon Works Engineering Bulletin; Echelon Corporation, Apr. 1997 (22 pages).

Lon Works for Audio Computer Control Network Applications; Echelon Corporation, Jan. 1995 (30 pages).

Demand Side Management with Lon Works Power Line Transceivers, Lon Works Engineering Bulletin; Echelon Corporation, Dec. 1996 (36 pages).

'Switching Hubs—Switching to the Fast Track', by Gary Gunnerson, PC Magazine, Oct. 11, 1994 (24 pages).

VISPLAN-10 Infrared Wireless LAN system; JVC May 1996 (10 pages).

'JVC Introduces Ethernet Compatible Wireless LAN System'; Business Wire Sep. 26, 1995 (1 page).

Ethernet Wireless LAN Systems; BYTE Feb. 1996 (3 pages).

'JVC Introduces First Ethernet Compatible Wireless LAN System'; Business Wire Nov. 8, 1995 (1 page).

Intelogis to Present on Stage at Internet Showcase 1998; PR Newswire Jan. 28, 1998 (1 page).

PassPort PC Plug In Quick Setup Guide; Intelogis P/N 30030202, date unknown (8 pages).

High Speed Networking with LAN Switches, by Gilbert Held; Copyright 1997 by John Wiley & Sons, Inc. (290 pages).

48-Volt DC Power Supply Connection Guide: 3Com Published Mar. 2000 (12 pages).

SuperStack II PS Hub User Guide; 3Com Published Jul. 1997 (188 pages).

SuperStack II Entry Hub User Guide; 3Com Published Nov. 1996 (8 pages).

SuperStack II Baseline Switch User Guide; 3Com Published Mar. 1998 (8 pages).

SuperStack II Baseline 10/100 switch; 3Com Published Apr. 1998 (8 pages).

SuperStack II Desktop Switch User Guide; 3Com Published Jun. 1997 (148 pages).

SuperStack II Switch 610 User Guide; 3Com Published May 1999 (54 pages).

Line carrier modems—1: Build a Pair of Line-Carrier Modems (Part 1); Radio Electronics, Jul. 1988, pp. 87-91 by Keith Nichols (7 pages).

Line carrier modems—2: Build a Pair of Line-Carrier Modems (Part 2); Radio Electronics, Aug. 1988, pp. 88-96 by Keith Nichols (5 pages).

Universal Serial Bus Specification Revision 1.0; Jan. 15, 1996 (268 pages).

3ComImpact IQ External ISDN Modem User product brochure; Published Jun. 1996 (4 pages).

3ComImpact IQ External ISDN Modem User Guide; Published Jul. 1997 (157 pages).

Cisco Catalyst 5000 Series Configuration Worksheet, 1996 (11 pages).

Cisco Catalyst 5000 Product Announcement, Published 1996 (22 pages).

Cisco Catalyst 5000 ATM Dual PHY LAN Emulation Module; Posted Sep. 24, 1996 (4 pages).

Cisco Catalyst 5000 Group Switching Ethernet Modules; Posted May 6, 1996 (5 pages).

The Mac Reborn; Macworld Sep. 1996, p. 104-115 (16 pages).

The Mac reborn; Macworld vol. 13, Issue 9, Sep. 1996 (9 pages).

Cisco Catalyst 5000; Industry's First Modular, Multilayer-Capable switching System for the Wiring Closet; Posted May 16, 1996 (22 pages).

Canned Heat; Data Communications Feb. 1996 (10 pages).

Fast Ethernet 100-Mbps Solutions; Posted Mar. 112, 1996 (10 pages).

Forget the Forklift; Data Communications Sep. 1996 (11 pages).

LAN Emulation; Posted Nov. 15, 1995 (16 pages).

IBM LAN Bridge and Switch Summary, IBM, published Jan. 1996 (70 pages).

Continuation of IBM LAN Bridge and Switch Summary, IBM, published Jan. 1996 (70 pages).

Grayson Evans, The Cebus Standard User's Guide May, 1996 (317 pages).

Technical Report TR-001 ADSL Forum System Reference Model May, 1996 (6 pages).

Motorola CableComm CyberSURFR Cable Modem Specifications; Apr. 1998 (4 pages).

IS-60.04; Node Communications Protocol Part 6: Application Layer Specification; Revision Apr. 18, 1996 (129 pages).

Hoffman, J.; "Cable, Television, and the Consumer Electronic Bus"; Panasonic Technologies, Inc., (date unknown) pp. 165-173.

Strassberg, Dan; "Home Automation Buses; Protocols Really Hit Home"; EDN Design Feature, Apr. 13, 1995 (9 pages).

\* cited by examiner

TELEPHONE OUTLET FOR IMPLEMENTING A LOCAL AREA NETWORK OVER TELEPHONE LINES AND A LOCAL AREA NETWORK USING SUCH OUTLETS

FIELD OF THE INVENTION

The present invention relates to the field of wired communication systems, and, more specifically, to the networking of devices using telephone lines.

BACKGROUND OF THE INVENTION

FIG. 1 shows the wiring configuration for a prior-art telephone system 10 for a residence or other building, wired with a telephone line 5. Residence telephone line 5 consists of single wire pair which connects to a junction-box 16, which in turn connects to a Public Switched Telephone Network (PSTN) 18 via a cable 17, terminating in a public switch 19, apparatus which establishes and enables telephony from one telephone to another. The term "analog telephony" herein denotes traditional analog low-frequency audio voice signals typically under 3 KHz, sometimes referred to as "POTS" ("plain old telephone service"), whereas the term "telephony" in general denotes any kind of telephone service, including digital service such as Integrated Services Digital Network (ISDN). The term "high-frequency" herein denotes any frequency substantially above such analog telephony audio frequencies, such as that used for data. ISDN typically uses frequencies not exceeding 100 Khz (typically the energy is concentrated around 40 Khz). The term "telephone line" herein denotes electrically-conducting lines which are intended primarily for the carrying and distribution of analog telephony, and includes, but is not limited to, such lines which may be pre-existing within a building and which may currently provide analog telephony service. The term "telephone device" herein denotes, without limitation, any apparatus for telephony (including both analog telephony and ISDN), as well as any device using telephony signals, such as fax, voice-modem, and so forth.

Junction box 16 is used to separate the in-home circuitry from the PSTN and is used as a test facility for troubleshooting as well as for wiring new telephone outlets in the home. A plurality of telephones 13a, 13b, and 13c connects to telephone line 5 via a plurality of telephone outlets 11a, 11b, 11c, and 11d. Each telephone outlet has a connector (often referred to as a "jack") denoted in FIG. 1 as 12a, 12b, 12c, and 12d, respectively. Each telephone outlet may be connected to a telephone via a connector (often referred to as a "plug"), denoted in FIG. 1 (for the three telephone illustrated) as 14a, 14b, and 14c, respectively. It is also important to note that lines 5a, 5b, 5c, 5d, and 5e are electrically the same paired conductors.

There is a requirement for using the existing telephone infrastructure for both telephone and data networking. In this way, the task of establishing a new local area network in a home or other building is simplified, because there would be no additional wires to install. U.S. Pat. No. 4,766,402 to Crane (hereinafter referred to as "Crane") teaches a way to form LAN over two-wire telephone lines, but without the telephone service.

The concept of frequency domain/division multiplexing (FDM) is well-known in the art, and provides means of splitting the bandwidth carried by a wire into a low-frequency band capable of carrying an analog telephony signal and a high-frequency band capable of carrying data communication or other signals. Such a mechanism is described for example in U.S. Pat. No. 4,785,448 to Reichert et al. (hereinafter referred to as "Reichert"). Also is widely used are xDSL systems, primarily Asymmetric Digital Subscriber Loop (ADSL) systems.

Relevant prior art in this field is also disclosed in U.S. Pat. No. 5,896,443 to Dichter (hereinafter referred to as "Dichter"). Dichter is the first to suggest a method and apparatus for applying such a technique for residence telephone wiring, enabling simultaneously carrying telephone and data communication signals. The Dichter network is illustrated in FIG. 2, which shows a network 20 serving both telephones and a local area network. Data Terminal Equipment (DTE) units 24a, 24b, and 24c are connected to the local area network via Data Communication Equipment (DCE) units 23a, 23b, and 23c, respectively. Examples of Data Communication Equipment include modems, line drivers, line receivers, and transceivers. DCE units 23a, 23b, and 23c are respectively connected to high pass filters (HPF) 22a, 22b, and 22c. The HPF's allow the DCE units access to the high-frequency band carried by telephone line 5. In a first embodiment (not shown in FIG. 2), telephones 13a, 13b, and 13c are directly connected to telephone line 5 via connectors 14a, 14b, and 14c, respectively. However, in order to avoid interference to the data network caused by the telephones, a second embodiment is suggested (shown in FIG. 2), wherein low pass filters (LPF's) 21a, 21b, and 21c are added to isolate telephones 13a, 13b, and 13c from telephone line 5. Furthermore, a low pass filter must also be connected to Junction-Box 16, in order to filter noises induced from or to the PSTN wiring 17. As is the case in FIG. 1, it is important to note that lines 5a, 5b, 5c, 5d, and 5e are electrically the same paired conductors.

However, the Dichter network suffers from degraded data communication performance, because of the following drawbacks:

1. Induced noise in the band used by the data communication network is distributed throughout the network. The telephone line within a building serves as a long antenna, receiving electromagnetic noise produced from outside the building or by local equipment such as air-conditioning systems, appliances, and so forth. Electrical noise in the frequency band used by the data communication network can be induced in the extremities of telephone line 5 (line 5e or 5a in FIG. 2) and propagated via telephone line 5 throughout the whole system. This is liable to cause errors in the data transportation.
2. The wiring media consists of a single long wire (telephone line 5). In order to ensure a proper impedance match to this transmission-line, it is necessary to install terminators at each end of telephone line 5. One of the advantages of using the telephone infrastructure for a data network, however, is to avoid replacing the internal wiring. Thus, either such terminators must be installed at additional cost, or suffer the performance problems associated with an impedance mismatch.
3. In the case where LPF 21 is not fitted to the telephones 13, each connected telephone appears as a non-terminated stub, and this is liable to cause undesirable signal reflections.
4. In one embodiment, LPF 21 is to be attached to each telephone 13. In such a configuration, an additional modification to the telephone itself is required. This further makes the implementation of such system complex and costly, and defeats the purpose of using an existing telephone line and telephone sets 'as is' for a data network.

5. The data communication network used in the Dichter network supports only the 'bus' type of data communication network, wherein all devices share the same physical media Such topology suffers from a number of drawbacks, as described in U.S. Pat. No. 5,841,360 to the present inventor, which is incorporated by reference for all purposes as if fully set forth herein. Dichter also discloses drawbacks of the bus topology, including the need for bus mastering and logic to contend with the data packet collision problem. Topologies that are preferable to the bus topology include the Token-Ring (IEEE 803), the PSIC network according to U.S. Pat. No. 5,841,360, and other point-to-point networks known in the art (such as a serial point-to-point 'daisy chain' network). Such networks are in most cases superior to 'bus' topology systems.

The above drawbacks affect the data communication performance of the Dichter network, and therefore limit the total distance and the maximum data rate such a network can support. In addition, the Dichter network typically requires a complex and therefore costly transceiver to support the data communication system. While the Reichert network relies on a star topology and does not suffer from these drawbacks of the bus topology, the star topology also has disadvantages. First, the star topology requires a complex and costly hub module, whose capacity limits the capacity of the network. Furthermore, the star configuration requires that there exist wiring from every device on the network to a central location, where the hub module is situated. This may be impractical and/or expensive to achieve, especially in the case where the wiring of an existing telephone system is to be utilized. The Reichert network is intended for use only in offices where a central telephone connection point already exists. Moreover, the Reichert network requires a separate telephone line for each separate telephone device, and this, too, may be impractical and/or expensive to achieve.

Although the above-mentioned prior-art networks utilize existing in-home telephone lines and feature easy installation and use without any additions or modifications to the telephone line infrastructure (wires, outlets, etc.), they require dedicated, non-standard, and complex DCE's, modems, and filters, and cannot employ standard interfaces. For example, Ethernet (such as IEEE802.3) and other standards are commonly used for personal computers communication in Local Area network (LAN) environments. With prior-art techniques, in order to support communication between computers, each computer must be equipped with an additional modem for communicating over the telephone line. Whether these additional modems are integrated into the computer (e.g. as plug-in or built-in hardware) or are furnished as external units between the computer and the telephone line, additional equipment is required. The prior-art networks therefore incur additional cost, space, installation labor, electricity, and complexity. It would therefore be desirable to provide a network which contains integral therewith the necessary standard interfaces, thereby obviating the need to provide such interfaces in the DTE's.

There is thus a widely-recognized need for, and it would be highly advantageous to have, a means for implementing a data communication network using existing telephone lines of arbitrary topology, which continues to support analog telephony, while also allowing for improved communication characteristics by supporting a point-to-point topology network.

Furthermore, there is also a need for, and it would be highly advantageous to have, a means and method for implementing such an in-house data communication network using existing telephone lines, wherein the DTE's (e.g. computers, appliances) can be interconnected solely by using standard interfaces, without the need for modifications or adding external units to the DTE's.

SUMMARY OF THE INVENTION

It is therefore an object of the present invention to provide a method and apparatus for upgrading an existing telephone line wiring system within a residence or other building, to provide both analog telephony service and a local area data network featuring a serial "daisy chained" or other arbitrary topology.

To this end, the regular telephone outlets are first replaced with network outlets to allow splitting of the telephone line having two or more conductors into segments such that each segment connecting two network outlets is fully separated from all other segments. Each segment has two ends, to which various devices, other segments, and so forth, may be connected via the network outlets, and are such that the segments can concurrently transport telephony and data communications signals. A network outlet contains a low pass filter, which is connected in series to each end of the segment, thereby forming a low-frequency between the external ports of the low pass filters, utilizing the low-frequency band. Similarly, a network outlet contains a high pass filter, which is connected in series to each end of the segment, thereby forming a high-frequency path between the external ports of the high pass filters, utilizing the high-frequency band The bandwidth carried by the segments is thereby split into non-overlapping frequency bands, and the distinct paths can be interconnected via the high pass filters and low pass filters as coupling and isolating devices to form different paths. Depending on how the devices and paths are selectively connected, these paths may be simultaneously different for different frequencies. A low-frequency band is allocated to regular telephone service (analog telephony), while a high-frequency band is allocated to the data communication network. In the low-frequency (analog telephony) band, the wiring composed of the coupled low-frequency paths appears as a normal telephone line, in such a way that the low-frequency (analog telephony) band is coupled among all the segments and is accessible to telephone devices at any network outlet, whereas the segments may remain individually isolated in the high-frequency (data) band, so that in this data band the communication media, if desired, can appear to be point-to-point (such as a serialized "daisy chain") from one network outlet to the next. The term "low pass filter" herein denotes any device that passes signals in the low-frequency (analog telephony) band but blocks signals in the high-frequency (data) band. Conversely, the term "high pass filter" herein denotes any device that passes signals in the high-frequency (data) band but blocks signals in the low-frequency (analog telephony) band. The term "data device" herein denotes any apparatus that handles digital data, including without limitation modems, transceivers, Data Communication Equipment, and Data Terminal Equipment.

Each network outlet has a standard data interface connector which is coupled to data interface circuitry for establishing a data connection between one or more segments and a data device, such as Data Terminal Equipment, connected to the data interface connector.

A network according to the present invention allows the telephone devices to be connected as in a normal telephone installation (i.e., in parallel over the telephone lines), but can be configured to virtually any desired topology for data transport and distribution, as determined by the available existing telephone line wiring and without being constrained to any predetermined data network topology. Moreover, such a network offers the potential for the improved data transport and distribution performance of a point-to-point network topology, while still allowing a bus-type data network topology in all or part of the network if desired. This is in contrast to the prior art, which constrains the network topology to a predetermined type.

Data Terminal Equipment as well as telephone devices can be readily connected to the network outlets using standard interfaces and connectors, thereby allowing a data communications network as well as a telephone system to be easily configured, such that both the data communications network and the telephone system can operate simultaneously without interference between one another.

A network according to the present invention may be used advantageously when connected to external systems and networks, such as XDSL, ADSL, as well as the Internet.

In a first embodiment, the high pass filters are connected in such a way to create a virtual 'bus' topology for the high-frequency band, allowing for a local area network based on DCE units or transceivers connected to the segments via the high pass filters. In a second embodiment, each segment end is connected to a dedicated modem, hence offering a serial point-to-point daisy chain network. In all embodiments of the present invention, DTE units or other devices connected to the DCE units can communicate over the telephone line without interfering with, or being affected by, simultaneous analog telephony service. Unlike prior-art networks, the topology of a network according to the present invention is not constrained to a particular network topology determined in advance, but can be adapted to the configuration of an existing telephone line installation. Moreover, embodiments of the present invention that feature point-to-point data network topologies exhibit the superior performance characteristics that such topologies offer over the bus network topologies of the prior art, such as the Dichter network and the Crane network.

Therefore, according to a first aspect of the present invention there is provided a local area network within a building, for transporting data among a plurality of data devices, the local area network including:
(a) at least two network outlets, each of said network outlets having:
  i) at least one data interface connector and data interface circuitry coupled to said data interface connector and operative to establishing a data connection between a data device and said data interface connector;
  ii) at least one standard telephone connector operative to supporting standard telephony service by connecting a standard telephone device;
  iii) a splitter operative to separating telephony and data communications signals; and
  iv) a coupler operative to combining telephony and data communications signals;
(b) at least one telephone line segment within the walls of the building, each said telephone line segment connecting at least two of said network outlets and having at least two conductors, said telephone line segment operative to concurrently transporting telephony and data communication signals; and
(c) at least one modem housed within each of said network outlets for establishing a data connection over said at least one telephone line segment, said at least one modem operative to transmitting and receiving signals over said telephone line segment, and coupled thereto.

According to a second aspect of the invention there is provided a network outlet for configuring a local area network for the transport of data across telephone lines and for enabling telephony across the telephone lines simultaneous with the transport of data, the network outlet comprising:
(a) at least one data interface connector and data interface circuitry coupled to said at least one data interface connector and being jointly operative to establishing a data connection between a data device and said at least one data interface connector;
(b) at least one telephone connector operative to supporting standard telephony service by connecting a standard telephone device thereto;
(c) a splitter adapted to be coupled to the telephone lines and being operative to separating telephony and data communications signals transported over the telephone lines; and
(d) a coupler having an output adapted to be coupled to the telephone lines and being operative to combining telephony and data communications signals to be transported over the telephone lines.

According to a third aspect, the invention provides a method for upgrading an existing telephone system to operate both for telephony and as a local area network for transporting data among a plurality of data devices, the telephone system having a plurality of telephone outlets connected to at least one telephone line within the walls of a building, the method comprising the steps of:
(a) mechanically removing at least two of the telephone outlets from the walls of the building;
(b) electrically disconnecting said at least two telephone outlets from the at least one telephone line;
(c) providing at least two network outlets, each of said network outlets having a data interface connector and data interface circuitry coupled to said data interface connector and operative to establishing a data connection between a data device and said data interface connector;
(d) electrically connecting said network outlets to the at least one telephone line; and
(e) mechanically securing said network outlets to the wall.

BRIEF DESCRIPTION OF THE DRAWINGS

The invention is herein described, by way of non-limiting example only, with reference to the accompanying drawings, wherein.

DETAILED DESCRIPTION OF PREFERRED EMBODIMENTS

Figure 1:
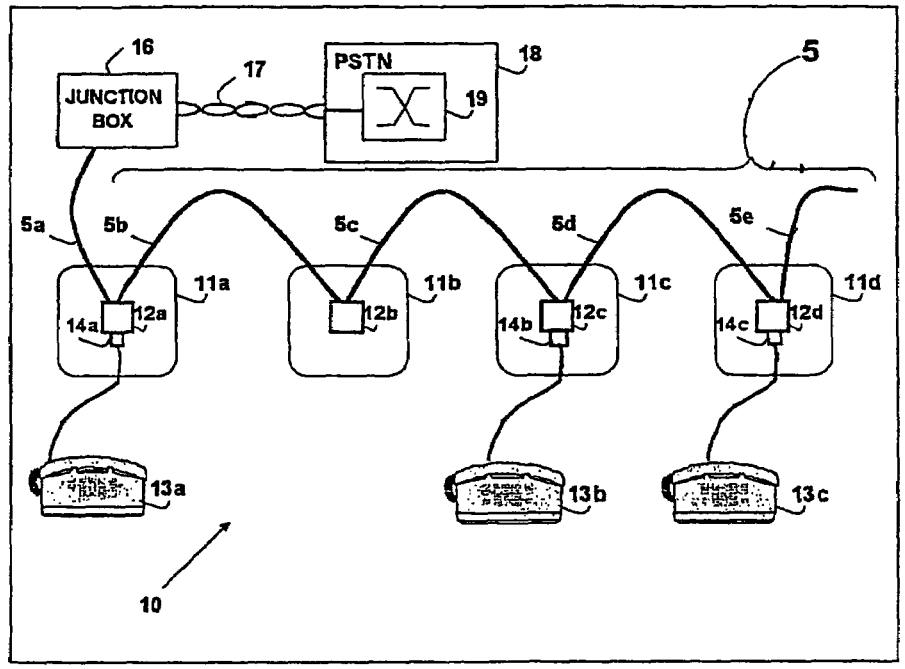
FIG. 1 shows a common prior art telephone line wiring configuration for a residence or other building.

The principles and operation of a network according to the present invention may be understood with reference to the drawings and the accompanying description. The drawings and descriptions are conceptual only. In actual practice, a single component can implement one or more functions; alternatively, each function can be implemented by a plurality of components and circuits. In the drawings and descriptions, identical reference numerals indicate those components which are common to different embodiments or configurations.

Figure 3:
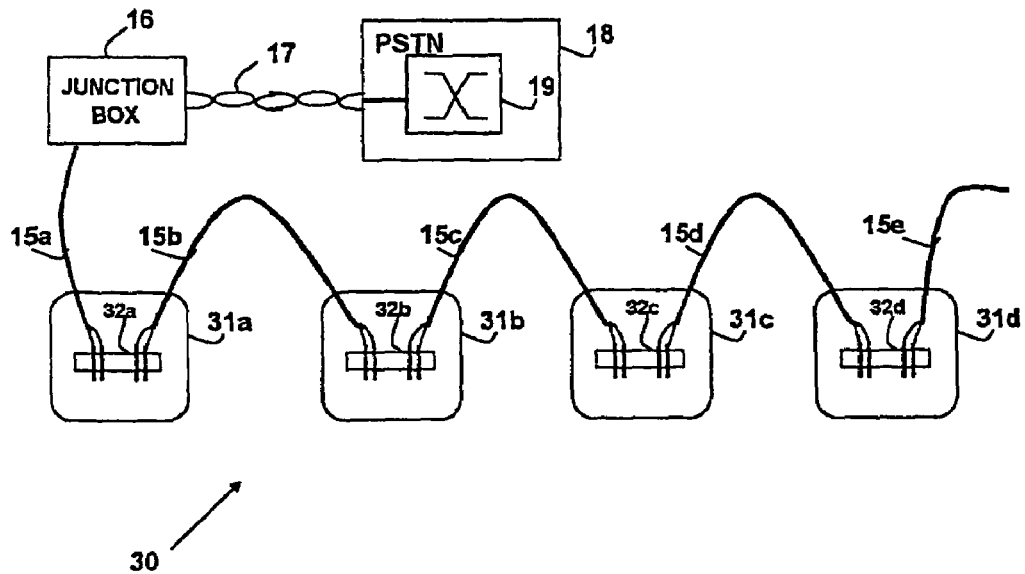
FIG. 3 shows modifications to telephone line wiring according to the present invention for a local area network.

The basic concept of the invention is shown in FIG. 3. A network 30 is based on network outlets 31a, 31b, 31c, and 31d. The installation of a network supporting both telephony and data communications relates to the installation of such network outlets. Similarly, the upgrade of an existing telephone system relates to replacing the existing telephone outlets with network outlets. In the descriptions which follow, an upgrade of an existing telephone system is assumed, but the procedures can also be applied in a like manner for an initial installation that supports both telephony and data communications.

A network outlet is physically similar in size, shape, and overall appearance to a standard telephone outlet, so that a network outlet can be substituted for a standard telephone outlet in the building wall. No changes are required in the overall telephone line layout or configuration. The wiring is changed by separating the wires at each network outlet into distinct segments of electrically-conducting media. Thus, each segment connecting two network outlets can be individually accessed from either end. In the prior art Dichter network, the telephone wiring is not changed, and is continuously conductive from junction box 16 throughout the system. According to the present invention, the telephone line is broken into electrically distinct isolated segments 15a, 15b, 15c, 15d, and 15e, each of which connects two network outlets. In order to fully access the media, each of connectors 32a, 32b, 32c, and 32d must support four connections, two in each segment. This modification to the telephone line can be carried out by replacing each of the telephone outlets 31a, 31b, 31c, and 31d. As will be explained later, the substitutions need be performed only at those places where it is desirable to be able to connect to data network devices. A minimum of two telephone outlets must be replaced with network outlets, enabling data communication between those network outlets only.

Figure 4:
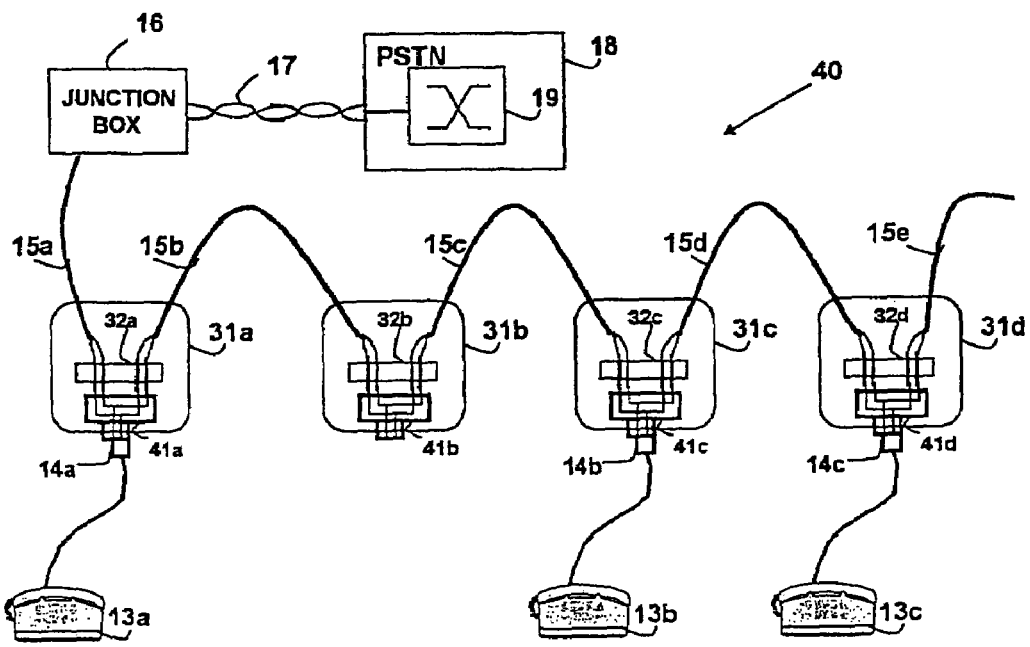
FIG. 4 shows modifications to telephone line wiring according to the present invention, to support regular telephone service operation.

FIG. 4 shows how a network 40 of the present invention continues to support regular telephone service, by the installation of jumpers 41a, 41b, 41c, and 41d in network outlets 31a, 31b, 31c and 31d respectively. At each network outlet where they are installed, the jumpers connect both segment ends and allow telephone connection to the combined segment. Installation of a jumper effects a re-connection of the split telephone line at the point of installation. Installation of jumpers at all network outlets would reconstruct the prior art telephone line configuration as shown in FIG. 1. Such jumpers can be add-ons to the network outlets, integrated within the network outlets, or integrated into a separate module. Alternately, a jumper can be integrated within a telephone set, as part of connector 14. The term "jumper" herein denotes any device for selectively coupling or isolating the distinct segments in a way that is not specific to the frequency band of the coupled or isolated signals. Jumper 41 can be implemented with a simple electrical connection between the connection points of connector 32 and the external connection of the telephone.

As described above, jumpers 41 are to be installed in all network outlets which are not required for connection to the data communication network. Those network outlets which are required to support data communication connections, however, will not use jumper 41 but rather a splitter 50, shown in FIG. 5. Such a splitter connects to both segments in each network outlet 31 via connector 32, using a port 54 for a first connection and a port 55 for a second connection. Splitter 50 has two LPF's for maintaining the continuity of the audio/telephone low-frequency band. After low pass filtering by LPF 51a for the port 54 and LPF 51b for port 55, the analog telephony signals are connected together and connected to a telephone connector 53, which may be a standard telephone connector. Hence, from the telephone signal point of view, the splitter 50 provides the same continuity and telephone access provided by the jumper 41. On the other hand, the data communication network employs the high-frequency band, access to which is made via HPF's 52a and 52b. HPF 52a is connected to port 54 and HPF 52b is connected to port 55. The high pass filtered signals are not passed from port 54 to port 55, but are kept separate, and are routed to a data interface connector 56 and a data interface connector 57, respectively, which may be standard data connectors. The term "splitter" herein denotes any device for selectively coupling or isolating the distinct segments that is specific to the frequency band of the coupled or isolated signals. The term "coupler" is used herein in reference to any device used for combining separate signals into a combined signal encompassing the originally-separate signals, including a device such as a splitter used for signal coupling.

Therefore, when installed in a network outlet, splitter 50 serves two functions. With respect to the low-frequency analog telephony band, splitter 50 establishes a coupling to effect the prior-art configuration shown in FIG. 1, wherein all telephone devices in the premises are connected virtually in parallel via the telephone line, as if the telephone line were not broken into segments. On the other hand, with respect to the high-frequency data communication network, splitter 50 establishes electrical isolation to effect the configuration shown in FIG. 3, wherein the segments are separated, and access to each segment end is provided by the network outlets. With the use of splitters, the telephone system and the data communication network are actually decoupled, with each supporting a different topology.

Figure 6:
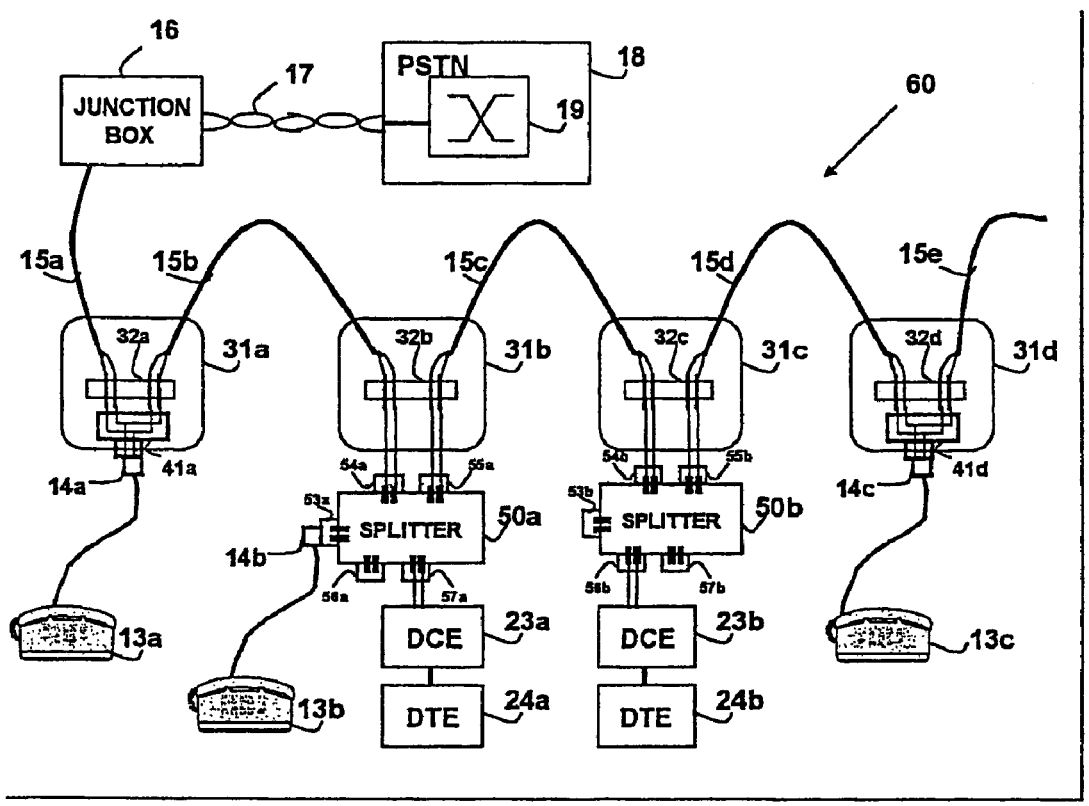
FIG. 6 shows a local area network based on telephone lines according to the present invention, wherein the network supports two devices at adjacent network outlets.

FIG. 6 shows a first embodiment of a data communication network 60 between two DTE units 24a and 24b, connected to adjacent network outlets 31b and 31c, which are connected together via a single segment 15c. Splitters 50a and 50b are connected to network outlets 31b and 31c via connectors 32b and 32c, respectively. As explained above, the splitters allow transparent audio/telephone signal connection. Thus, for analog telephony, the telephone line remains virtually unchanged, allowing access to telephone external connection 17 via junction box 16 for telephones 13a and 13c. Likewise, telephone 13b connected via connector 14b to a connector 53a on splitter 50a, is also connected to the telephone line. In a similar way, an additional telephone can be added to network outlet 31c by connecting the telephone to connector 53b on splitter 50b. It should be clear that connecting a telephone to a network outlet, either via jumper 41 or via splitter 50 does not affect the data communication network.

Figure 5:
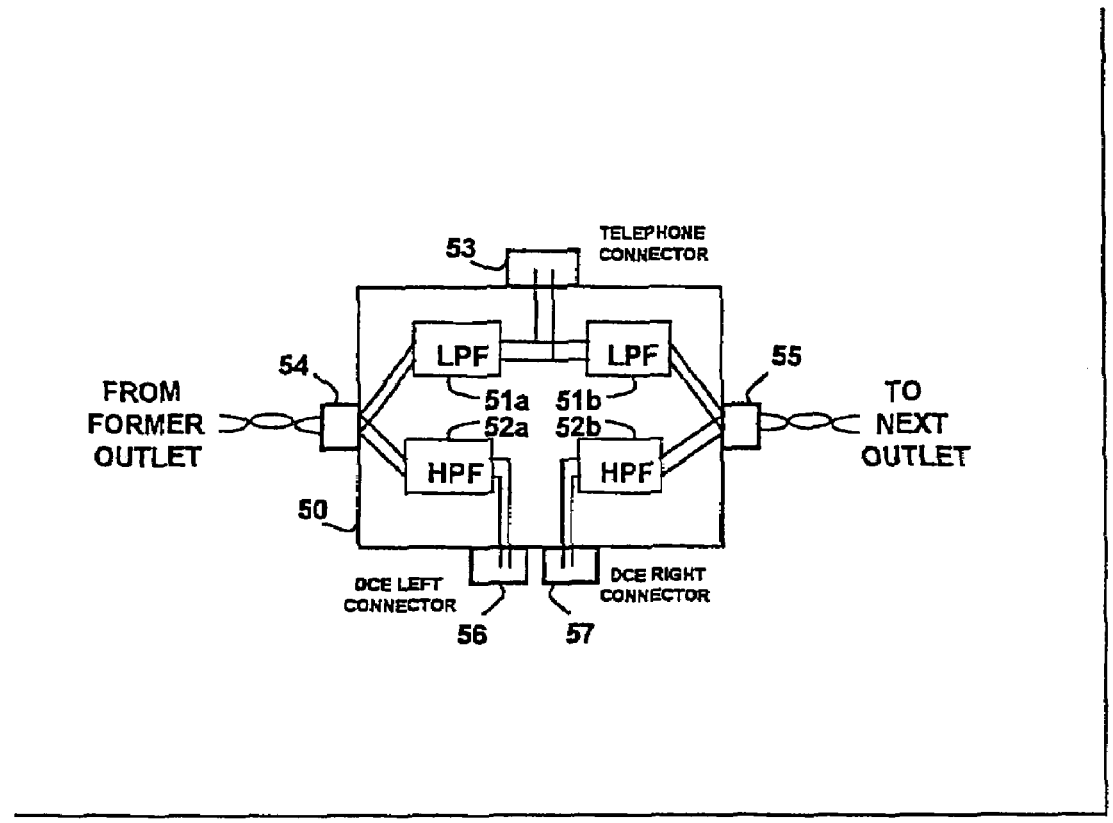
FIG. 5 shows a splitter according to the present invention.

Network 60 (FIG. 6) supports data communication by providing a communication path between port 57a of splitter 50a and port 56b of splitter 50b. Between those ports there exists a point-to-point connection for the high-frequency portion of the signal spectrum, as determined by HPF 52a and 52b within splitters 50 (FIG. 5). This path can be used to establish a communication link between DTE units 24a and 24b, by means of DCE units 23a and 23b, which are respectively connected to ports 57a and 56b. The communication between DTE units 24a and 24b can be unidirectional, half-duplex, or full-duplex. The only limitation imposed on the communication system is the capability to use the high-frequency portion of the spectrum of segment 15c. As an example, the implementation of data transmission over a telephone line point-to-point system described in Reichert can also be used in network 60. Reichert implements both LPF and HPF by means of a transformer with a capacitor connected in the center-tap, as is well-known in the art. Similarly, splitter 50 can be easily implemented by two such circuits, one for each side.

It should also be apparent that HPF 52a in splitter 50a and HPF 52b in splitter 50b can be omitted, because neither port 56a in splitter 50a nor port 57b in splitter 50b is connected.

Network 60 provides clear advantages over the networks described in the prior art. First, the communication media supports point-to-point connections, which are known to be superior to multi-tap (bus) connections for communication performance. In addition, terminators can be used within each splitter or DCE unit, providing a superior match to the transmission line characteristics. Furthermore, no taps (drops) exists in the media, thereby avoiding impedance matching problems and the reflections that result therefrom.

Moreover, the data communication system in network 60 is isolated from noises from both the network and the 'left' part of the telephone network (Segments 15a and 15b), as well as noises induced from the 'right' portion of the network (Segments 15d and 15e). Such isolation is not provided in any prior-art implementation. Dichter suggests installation of a low pass filter in the junction box, which is not a satisfactory solution since the junction box is usually owned by the telephone service provider and cannot always be accessed. Furthermore, safety issues such as isolation, lightning protection, power-cross and other issues are involved in such a modification.

Implementing splitter 50 by passive components only, such as two transformers and two center-tap capacitors, is also advantageous, since the reliability of the telephone service will not be degraded, even in the case of failure in any DCE unit, and furthermore requires no external power. This accommodates a 'life-line' function, which provides for continuous telephone service even in the event of other system malfunction (e.g. electrical failures).

The splitter 50 can be integrated into network outlet 31. In such a case, network outlets equipped with splitter 50 will have two types of connectors: One regular telephone connector based on port 53, and one or two connectors providing access to ports 56 and 57 (a single quadruple-circuit connector or two double-circuit connectors). Alternatively, splitter 50 can be an independent module attached as an add-on to network outlet 31. In another embodiment, the splitter is included as part of DCE 23. However, in order for network 60 to operate properly, either jumper 41 or splitter 50 must be employed in network outlet 31 as modified in order to split connector 32 according to the present invention, allowing the retaining of regular telephone service.

Figure 7:
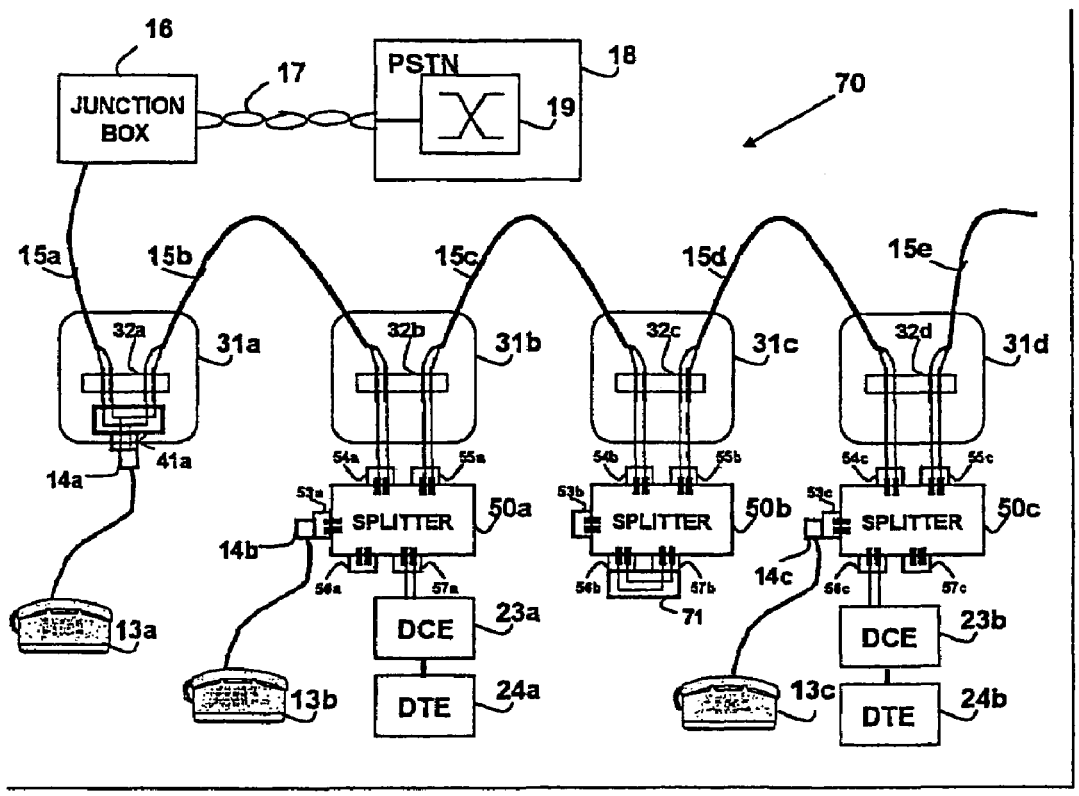
FIG. 7 shows a first embodiment of a local area network based on telephone lines according to the present invention, wherein the network supports two devices at non-adjacent network outlets.

FIG. 7 also shows data communication between two DTE units 24a and 24b in a network 70. However, in the case of network 70, DTE units 24a and 24b are located at network outlets 31b and 31d, which are not directly connected, but have an additional network outlet 31c interposed between. Network outlet 31c is connected to network outlet 31b via a segment 15c, and to network outlet 31d via a segment 15d.

In one embodiment of network 70, a jumper (not shown, but similar to jumper 41 in FIG. 4) is connected to a connector 32c in network outlet 31c. The previous discussion regarding the splitting of the signal spectrum also applies here, and allows for data transport between DTE units 24a and 24b via the high-frequency portion of the spectrum across segments 15c and 15d. When only jumper 41 is connected at network outlet 31c, the same point-to-point performance as previously discussed can be expected; the only influence on communication performance is from the addition of segment 15d, which extends the length of the media and hence leads to increased signal attenuation. Some degradation, however, can also be expected when a telephone is connected to jumper 41 at network outlet 31c. Such degradation can be the result of noise produced by the telephone in the high-frequency data communication band, as well as the result the addition of a tap caused by the telephone connection, which usually has a non-matched termination. Those problems can be overcome by installing a low pass filter in the telephone.

In a preferred embodiment of network 70, a splitter 50b is installed in network outlet 31c. Splitter 50b provides the LPF functionality, and allows for connecting a telephone via connector 53b. However, in order to allow for continuity in data communication, there must be a connection between the circuits in connectors 56b and 57b. Such a connection is obtained by a jumper 71, as shown in FIG. 7. Installation of splitter 50b and jumper 71 provides good communication performance, similar to network 60 (FIG. 6). From this discussion of a system wherein there is only one unused network outlet between the network outlets to which the DTE units are connected, it should be clear that the any number of unused network outlets between the network outlets to which the DTE units are connected can be handled in the same manner.

Figure 8:
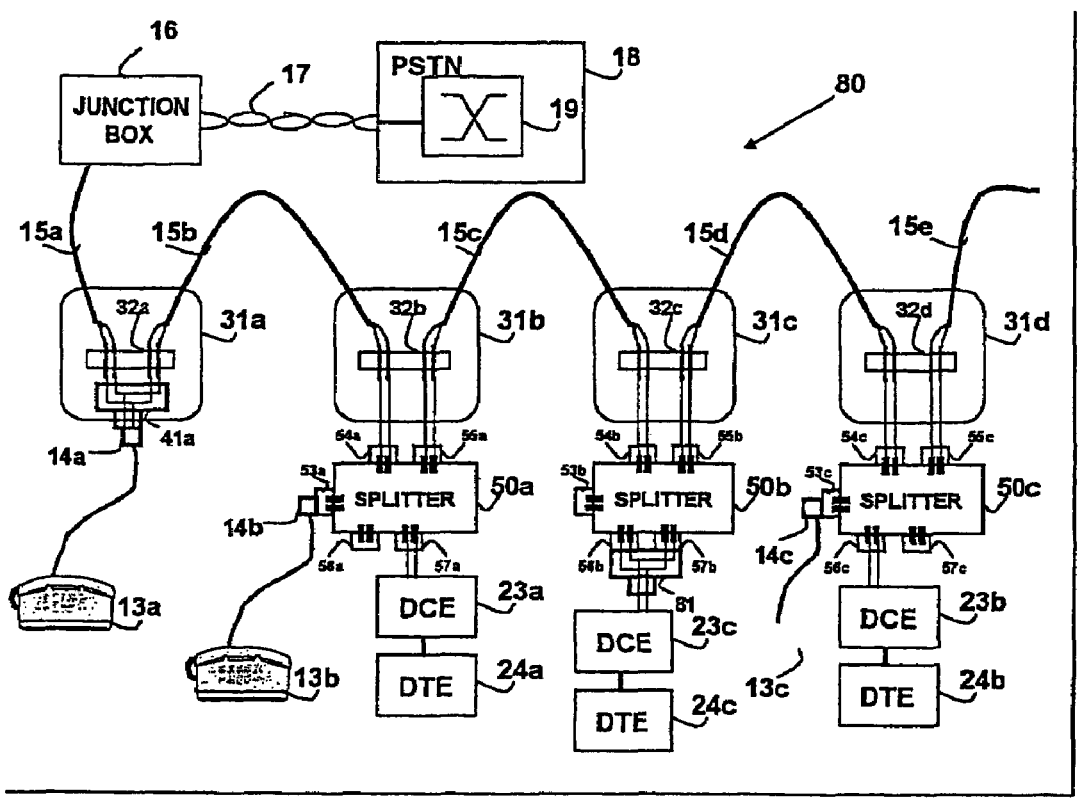
FIG. 8 shows a second embodiment of a local area network based on telephone lines according to the present invention, wherein the network supports three devices at adjacent network outlets.

For the purpose of the foregoing discussions, only two communicating DTE units have been described. However, the present invention can be easily applied to any number of DTE units. FIG. 8 illustrates a network 80 supporting three DTE units 24a, 24b, and 24c, connected thereto via DCE units 23a, 23b, and 23c, respectively. The structure of network 80 is the same as that of network 70 (FIG. 7), with the exception of the substitution of jumper 71 with a jumper 81. Jumper 81 makes a connection between ports 56b and 57b in the same way as does jumper 71. However, in a manner similar to that of jumper 41 (FIG. 4), jumper 81 further allows for an external connection to the joined circuits, allowing the connection of external unit, such as a DCE unit 23c. In this way, segments 15c and 15d appear electrically-connected for high-frequency signals, and constitute media for a data communication network connecting DTE units 24a, 24b, and 24c. Obviously, this configuration can be adapted to any number of network outlets and DTE units. In fact, any data communication network which supports a 'bus' or multi-point connection over two-conductor media, and which also makes use of the higher-frequency part of the spectrum can be used. In addition, the discussion and techniques explained in the Dichter patent are equally applicable here. Some networks, such as Ethernet IEEE 802.3 interface 10BaseT and 100BaseTX, require a four-conductor connection, two conductors (usually single twisted-wire pair) for transmitting, and two conductors (usually another twisted-wire pair) for receiving. As is known in the art, a four-to-two wires converter (commonly known as hybrid) can be used to convert the four wires required into two, thereby allowing network data transport over telephone lines according to the present invention. A network according to the present invention can therefore be an Ethernet network.

As with jumper 41 (FIG. 4), jumper 81 can be an integral part of splitter 50, an integral part of DCE 23, or a separate component.

In order to simplify the installation and operation of a network, it is beneficial to use the same equipment in all parts of the network. One such embodiment supporting this approach is shown in for a set of three similar network outlets in FIG. 8, illustrating network 80. In network 80, network outlets 31b, 31c, and 31d are similar and are all used as part of the data communication network. Therefore for uniformity, these network outlets are all coupled to splitters 50a, 50b, and 50c respectively, to which jumpers are attached, such as a jumper 81 attached to splitter 50b (the corresponding jumpers attached to splitter 50a and splitter 50c have been omitted from FIG. 8 for clarity), and thus provide connections to local DCE units 23a, 23c, and 23b, respectively. In a preferred embodiment of the present invention, all telephone outlets in the building will be replaced by network outlets which include both splitter 50 and jumper 81 functionalities. Each such network outlet will provide two connectors: one connector coupled to port 53 for a telephone connection, and the other connector coupled to jumper 81 for a DCE connection.

The terms "standard connector", "standard telephone connector", and "standard data connector" are used herein to denote any connectors which are industry-standard or de facto standard connectors. Likewise, the term "standard telephone device" is used herein to denote any telephone device which is a commercial standard or de facto standard telephone device, and the term "standard telephony service" is used herein to denote any commercially-standard or de facto standard telephony.

In yet another embodiment, DCE 23 and splitter 50 are integrated into the housing of network outlet 31, thereby offering a direct DTE connection. In a preferred embodiment, a standard DTE interface is employed.

Figure 9:
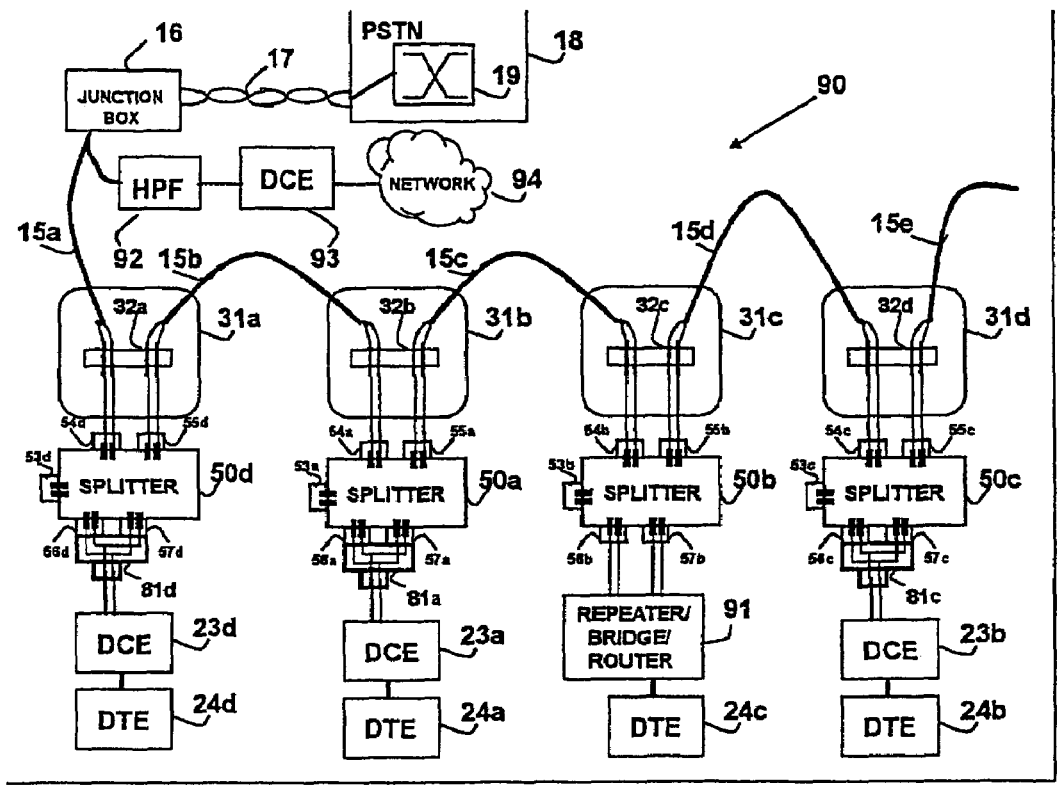
FIG. 9 shows third embodiment of a local area network based on telephone lines according to the present invention, wherein the network is a bus type network.

In most 'bus' type networks, it is occasionally required to split the network into sections, and connect the sections via repeaters (to compensate for long cabling), via bridges (to decouple each section from the others), or via routers. This may also be according to the present invention, as illustrated in FIG. 9 for a network 90, which employs a repeater/bridge/router unit 91. Unit 91 can perform repeating, bridging, routing, or any other function associated with a split between two or more networks. As illustrated, a splitter 50b is coupled to a network outlet 31c, in a manner similar to the other network outlets and splitters of network 90. However, at splitter 50b, no jumper is employed. Instead, a repeater/bridge/router unit 91 is connected between port 56b and port 57b, thereby providing a connection between separate parts of network 90. Optionally, unit 91 can also provide an interface to DTE 24c for access to network 90.

As illustrated above, a network outlet can also function as a repeater by the inclusion of the appropriate data interface circuitry. Circuitry implementing modems, and splitters, such as the high pass filters as well as the low pass filters, can function as data interface circuitry.

FIG. 9 also demonstrates the capability of connecting to external DTE units or networks, via a high pass filter 92 connected to a line 15a. Alternatively, HPF 92 can be installed in junction box 16. HPF 92 allows for additional external units to access network 90. As shown in FIG. 9, HPF 92 is coupled to a DCE unit 93, which in turn is connected to a network 94. In this configuration, the local data communication network in the building becomes part of network 94. In one embodiment, network 94 offers ADSL service, thereby allowing the DTE units 24d, 24a, 24c, and 24b within the building to communicate with the ADSL network. The capability of communicating with external DTE units or networks is equally applicable to all other embodiments of the present invention, but for clarity is omitted from the other drawings.

Figure 10:
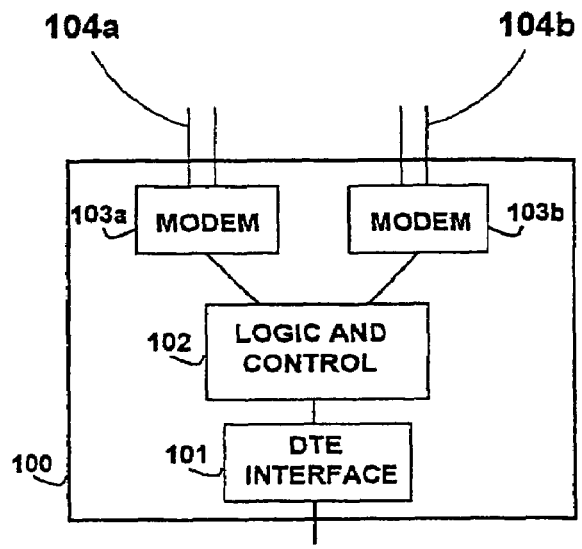
FIG. 10 shows a node of local area network based on telephone lines according to the present invention.

While the foregoing relates to data communication networks employing bus topology, the present invention can also support networks where the physical layer is distinct within each communication link. Such a network can be a Token-Passing or Token-Ring network according to IEEE 802, or preferably a PSIC network as described in U.S. Pat. No. 5,841,360 to the present inventor, which details the advantages of such a topology. FIG. 10 illustrates a node 100 for implementing such a network. Node 100 employs two modems 103a and 103b, which handle the communication physical layer. Modems 103a and 103b are independent, and couple to dedicated communication links 104a and 104b, respectively. Node 100 also features a DTE interface 101 for connecting to a DTE unit (not shown). A control and logic unit 102 manages the higher OSI layers of the data communication above the physical layer, processing the data to and from a connected DTE and handling the network control. Detailed discussion about such node 100 and the functioning thereof can be found in U.S. Pat. No. 5,841,360 and other sources known in the art.

Figure 11A:
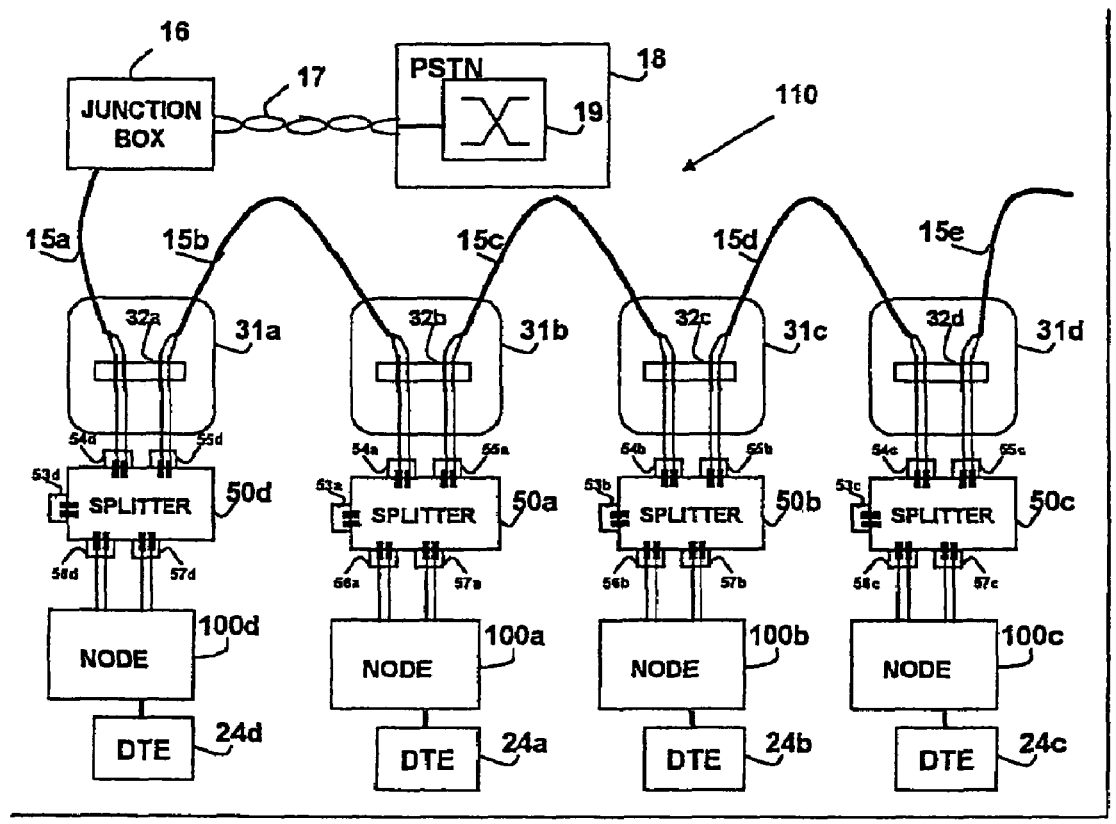
FIG. 11A shows a fourth embodiment of a local area network based on telephone lines according to the present invention.

FIG. 11 describes a network 110 containing nodes 100d, 100a, 100b, and 100c coupled directly to splitters 50d, 50a, 50b and 50c, which in turn are coupled to network outlets 31a, 31b, 31c, and 31d respectively. Each node 100 has access to the corresponding splitter 50 via two pairs of contacts, one of which is to connector 56 and the other of which is to connector 57. In his way, for example, node 100a has independent access to both segment 15b and segment 15c. This arrangement allows building a network connecting DTE units 24d, 24a, 24b, and 24c via nodes 100d, 100a, 100b, and 100c, respectively.

For clarity, telephones are omitted from FIGS. 9 and 11, but it should be clear that telephones can be connected or removed without affecting the data communication network. Telephones can be connected as required via connectors 53 of splitters 50. In general, according to the present invention, a telephone can be connected without any modifications either to a splitter 50 (as in FIG. 8) or to a jumper 41 (as in FIG. 4).

Figure 2:
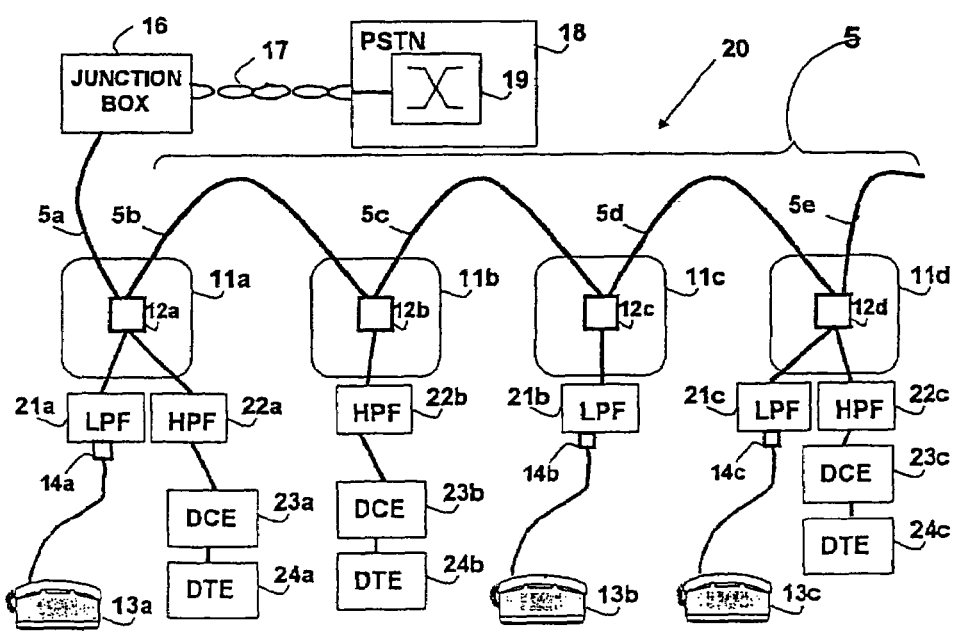
FIG. 2 shows a prior art local area network based on telephone line wiring for a residence or other building.

The present invention has been so far described in embodiments in which the telephone wiring segments are split, and which therefore modify the original galvanic continuity of the telephone wiring, as shown in FIG. 3. Such embodiments require the removal of outlets in order to access the internal wiring. However, the present invention can be applied equally-well to prior-art schemes such as the Dichter network (as illustrated in FIG. 2), wherein the continuity of the telephone wiring is not disturbed, and there the wiring is not split into electrically distinct segments.

Figure 11B:
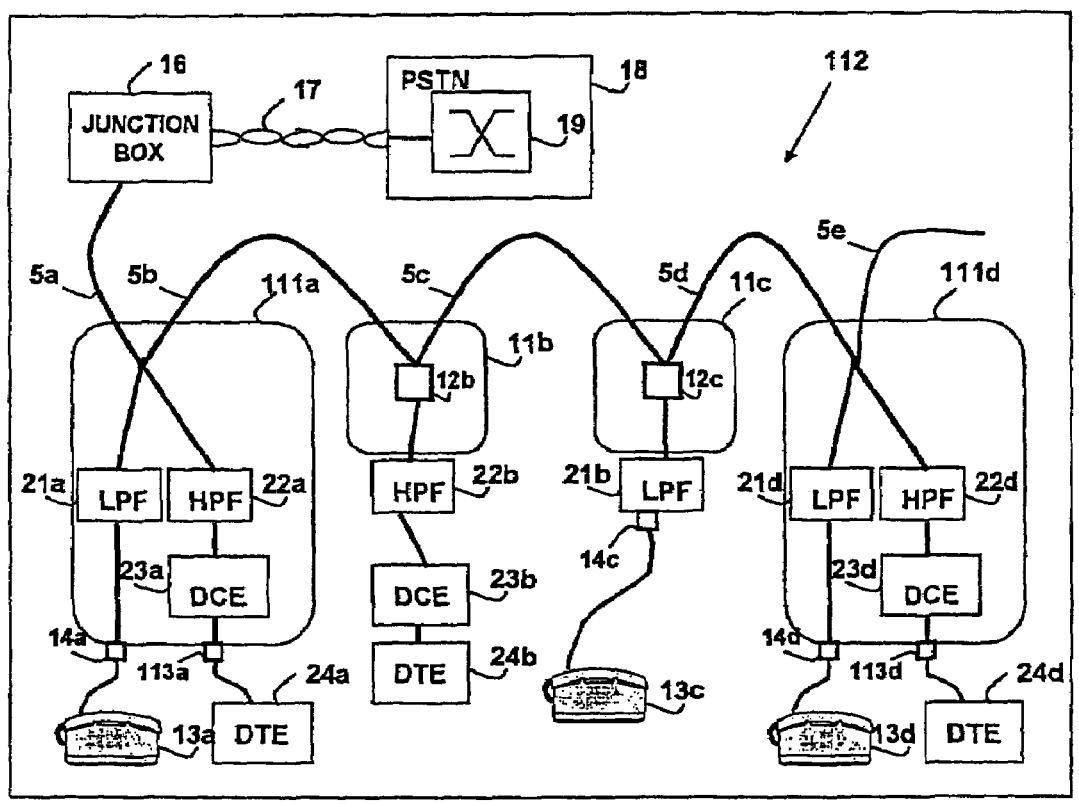
FIG. 11B shows an embodiment of the present invention for use with telephone wiring that is not separated into distinct segments.

Thus, an embodiment of a network utilizing the network outlets of the present invention is shown in FIG. 11B as a network 112. Generally, the Dichter network of FIG. 2 is employed. However, network outlets 111*a* and 111*d* (corresponding to network outlets 111*a* and 111*d* of FIG. 2) are modified so that all components are housed therein. In such a case, the splitter/combiner is a single low pass filter 21 and a single high pass filter 22. High pass filter 22 is coupled to single telephone-line modem/DCE 23. A single high pass filter, a single low pass filter, and a single DCE are used, since the connection to the telephone line involves a single point of connection. However, since point-to-point topology is not used in this case, modem 23 is expected to be more complex than in the other described embodiments. Each outlet 111 has standard telephone connector 14 for connecting the telephone set, and standard data connector 113 for the DTE connection. For example, a 10BaseT interface employing an RJ-45 connector can be used for the DTE connection.

Furthermore, although the present invention has so far been described with a single DTE connected to a single network outlet, multiple DTE units can be connected to a network outlet, as long as the corresponding node or DCE supports the requisite number of connections. Moreover, access to the communication media can be available for plurality of users using multiplexing techniques known in the art. In the case of time domain/division multiplexing (TDM) the whole bandwidth is dedicated to a specific user during a given time interval. In the case of frequency domain/division multiplexing (FDM), a number of users can share the media simultaneously, each using different non-overlapping portions of the frequency spectrum.

In addition to the described data communication purposes, a network according to the present invention can be used for control (e.g. home automation), sensing, audio, or video applications, and the communication can also utilize analog signals (herein denoted by the term "analog communication"). For example, a video signal can be transmitted in analog form via the network.

While the present invention has been described in terms of network outlets which have only two connections and therefore can connect only to two other network outlets (i.e., in a serial, or "daisy chain" configuration), the concept can also be extended to three or more connections. In such a case, each additional connecting telephone line must be broken at the network outlet, with connections made to the conductors thereof, in the same manner as has been described and illustrated for two segments. A splitter for such a multi-segment application should use one low pass filter and one high pass filter for each segment connection.

The present invention has also been described in terms of media having a single pair of wires, but can also be applied for more conductors. For example, ISDN employs two pairs for communication. Each pair can be used individually for a data communication network as described above.

Also as explained above, a network outlet 31 according to the invention (FIG. 3) has a connector 32 having at least four connection points. As an option, jumper 41 (FIG. 4), splitter 50 (FIG. 5), or splitter 50 with jumper 81 (FIG. 8), low pass filters, high pass filters, or other additional hardware may also be integrated or housed internally within network outlet 31. Moreover, the network outlet may contain standard connectors for devices, such as DTE units. In one embodiment, only passive components are included within the network outlet.

For example, splitter 50 can have two transformers and two capacitors (or an alternative implementation consisting of passive components). In another embodiment, the network outlet may contain active, power-consuming components. Three options can be used for providing power to such circuits:

1. Local powering: In this option, supply power is fed locally to each power-consuming network outlet. Such network outlets must be able to support connection for input power.
2. Telephone power: In both POTS and ISDN telephone networks, power is carried in the lines with the telephone signals. This power can also be used for powering the network outlet circuits, as long as the total power consumption does not exceed the POTS/ISDN system specifications. Furthermore, in some POTS systems the power consumption is used for OFF-HOOK/ON-HOOK signaling. In such a case, the network power consumption must not interfere with the telephone logic.
3. Dedicated power carried in the media: In this option, power for the data communication related components is carried in the communication media. For example, power can be distributed using 5 kHz signal. This frequency is beyond the telephone signal bandwidth, and thus does not interfere with the telephone service. The data communication bandwidth, however, be above this 5 kHz frequency, again ensuring that there is no interference between power and signals.

Figure 12:
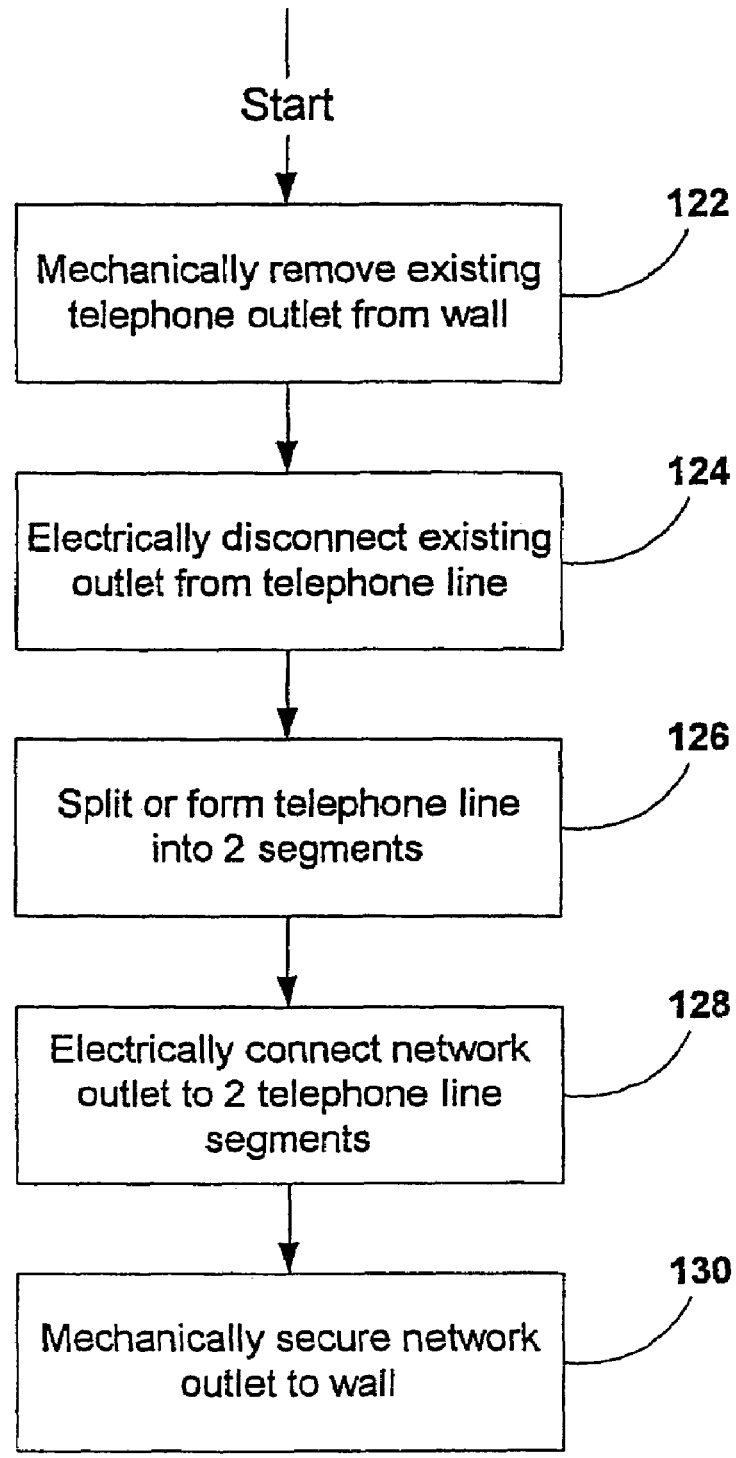
FIG. 12 is a flowchart illustrating the sequence of steps in an installation method according to the present invention for upgrading an existing telephone system.

Upgrading existing telephone lines within a building can be done by the method illustrated in the flowchart of FIG. 12. At least two telephone outlets must be replaced by network outlets in order to support data communications. For each outlet to be replaced, the steps of FIG. 12 are performed as shown. In a step 122, the existing telephone outlet is mechanically removed from the wall. Next, in a step 124, the existing telephone outlet is electrically disconnected from the telephone line. At this point in a step 126, the existing telephone line is split or formed into two isolated segments. Depending on the existing configuration of the telephone line, this could be done by cutting the telephone line into two segments, by separating two telephone lines which had previously been joined at the existing telephone outlet, or by utilizing an unused wire pair of the existing telephone line as a second segment. Then, in a step 128, the two segments are electrically connected to a new network outlet, in a manner previously illustrated in FIG. 5, where one of the segments is connected to connector 54 and the other segment is connected to connector 55. Note that separating the telephone line into two segments is not necessary in all cases. If only two network outlets are desired, the telephone line does not have to be split, because a single segment suffices to connect the two network outlets. If more than two network outlets are desired, however, the telephone line must be split or formed into more than one segment. Finally, in a step 130 (FIG. 12), the network outlet is mechanically replaced and secured into the wall in place of the original telephone outlet.

While the above description describes the non-limiting case where two wire segments are connected to the outlet (such as outlets 11*a*, 11*b*, 11*c* and 11*d*), in general it is also possible to connect a single segment or more than two segments to the outlet.

Figure 13:
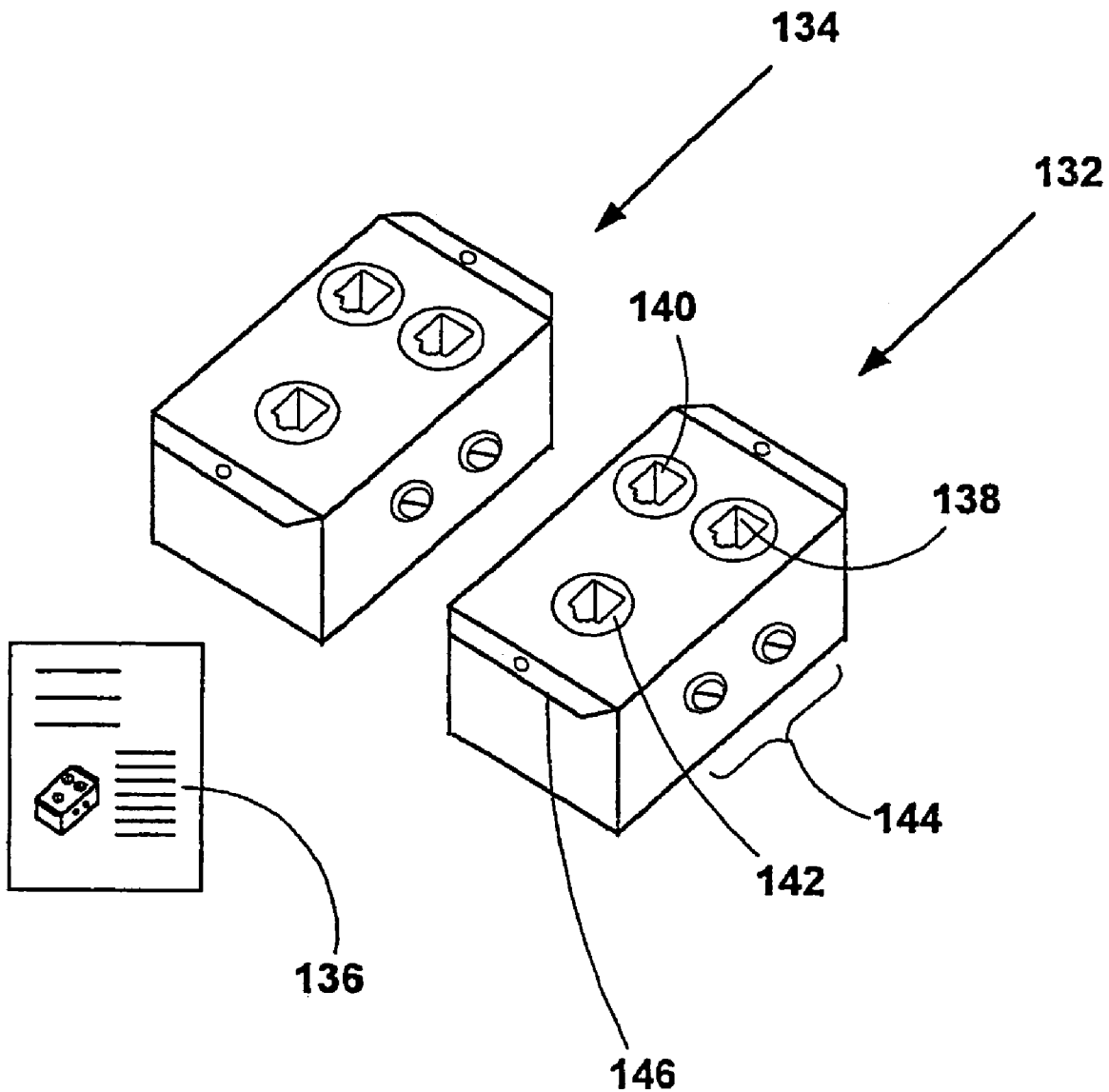
FIG. 13 illustrates the components of a basic kit according to the present invention for upgrading a telephone system to a local area data network.

In order to facilitate the upgrade of existing telephone systems for simultaneous telephony and data communications, the network outlets as described previously can be packaged in kit form with instructions for performing the method described above. As illustrated in FIG. 13, a basic kit contains two network outlets 132 and 134 with instructions 136, while supplementary kits need contain only a single network outlet 132. A network outlet 132 houses two standard data connectors 138 and 140, and a standard telephone connector 142, corresponding to connectors 57, 56, and 53, respectively, of FIG. 5. In addition, network outlet 132 has connectors 144 for electrically connecting to the segment of the telephone line. Connectors 144 correspond to connector 55 of FIG. 5 (connector 54 of FIG. 5 is omitted from FIG. 13 for clarity). Furthermore, network outlet 132 has flanges, such as a flange 146, for mechanically securing to a standard in-wall junction box. A homeowner could purchase a basic kit according to the present invention to upgrade an existing telephone system to a local area network, and then purchase whatever supplementary kits would be needed to expand the local area network to any degree desired.

While the invention has been described with respect to a limited number of embodiments, it will be appreciated that many variations, modifications and other applications of the invention may be made.

What is claimed is:

1. A digital access multiplexer apparatus for use with first, second and third telephone wire pairs, each telephone wire pair comprising two conductors and being connected to carry an analog telephone signal in an analog telephone frequency band and a bi-directional digital data signal in a digital data frequency band distinct from, and higher than, the analog telephone frequency band, said apparatus comprising:
    first, second and third wiring connectors for respectively connecting to the first, second, and third telephone wire pairs;
    first, second and third low pass filters respectively connected to said first, second, and third wiring connectors, each said low pass filter being operative to substantially pass only signals in the analog telephone frequency band;
    a telephone connector connectable to a telephony device and connected to said first low pass filter;
    first, second and third high pass filters respectively connected to said first, second, and third wiring connectors, each said high pass filter being operative to substantially pass only signals in the digital data frequency band;
    first, second and third telephone line modems respectively connected to said first, second, and third high pass filters, each said telephone line modem being operative to bi-directionally communicate digital data with a single mating modem in the digital data frequency band;
    a local area network connector connectable to a data unit;
    a transceiver connected to said local area network connector for packet-based full-duplex communication with the data unit;
    a router connected to said first, second and third telephone line modems and to said transceiver for sharing data therebetween; and
    a single enclosure housing said first, second and third low pass filters, said first, second and third high pass filters, said second connector, said first, second and third telephone line modems, said local area network connector, said transceiver and said router.

2. The apparatus according to claim 1, wherein the transceiver is a local area network transceiver operative for point-to-point packet-based full-duplex communication with an identical mating transceiver.

3. The apparatus according to claim 2, wherein the point-to-point packet-based full-duplex communication conforms to IEEE802.3 standard and the local area network connector is RJ-45.

4. The apparatus according to claim 2, wherein the point-to-point packet-based full-duplex communication conforms to 10BaseT or 100BaseT.

5. The apparatus according to claim 1, wherein at least one of said telephone line modems is operative to conduct the digital data signal over a pre-existing POTS-service telephone wire pair installed at least in part in a residence.

6. The apparatus according to claim 5, wherein all of said telephone line modems are operative to conduct the digital data signal over a pre-existing POTS-service telephone wire pair installed at least in part in the residence.

7. The apparatus according to claim 1, wherein at least one of said telephone line modems is operative for full-duplex communication over a point-to-point pre-existing POTS-service telephone wire pair installed at least in part external to a building.

8. The apparatus according to claim 7, wherein all of said telephone line modems are operative for full duplex communication over a point-to-point pre-existing POTS-service telephone wire pair installed at least in part external to the building.

9. The apparatus according to claim 1, wherein at least one of said telephone line modems is DSL based.

10. The apparatus according to claim 9, wherein all of said telephone line modems are DSL based.

11. The apparatus according to claim 10, wherein all of said telephone line modems are ADSL based.

12. The apparatus according to claim 1, wherein the packet-based communication is based on Internet Protocol.

13. The apparatus according to claim 1, further comprising first, second and third terminators each connected between a respective one of said first, second and third high pass filters and a respective one of said first, second and third telephone line modems for substantially terminating a signal received from the respective of said first, second, and third telephone wire pairs in the digital data frequency band.

14. The apparatus according to claim 1, wherein said apparatus is attachable to a wall of a building.

15. The apparatus according to claim 14, wherein said apparatus is further mountable on an external wall of the building.

16. The apparatus according to claim 1, wherein said apparatus is at least partially housed within an outlet.

17. The apparatus according to claim 1, wherein said first, second and third wiring connectors are parts of a single connector assembly.

18. The apparatus according to claim 1, wherein said telephone connector is a standard telephone connector.

19. The apparatus according to claim 18, wherein said telephone connector is a RJ-11 type connector.

20. The apparatus according to claim 1, further using frequency division multiplexing, wherein: the digital data frequency band contains multiple distinct frequency sub-bands each carrying digital data; at least one of said telephone line modems is operative to conduct the digital data in the frequency sub-bands; and at least part of the data in each frequency sub-band is distinct from the data carried over the other frequency sub-bands.

21. The apparatus according to claim 1, further using frequency division multiplexing, wherein: the digital data frequency band contains multiple distinct frequency sub-bands each carrying digital data; all of said telephone line modems are operative to conduct the digital data in the frequency sub-bands; and at least part of the data in each frequency sub-band is distinct from the data carried over the other frequency sub-bands.

22. The apparatus according to claim 1 further using time division multiplexing, wherein: at least some digital data carried over of one of said telephone wire pairs contain multiple distinct data streams; and said apparatus is further operative to pass at least one of the data streams between said local area network connector and the respective wiring connector.

23. The apparatus according to claim 1, further using time division multiplexing, wherein: the digital data carried over all of said telephone wire pairs contain multiple distinct data streams; and said apparatus is further operative to pass at least one of the data streams between said local area network connector and the respective wiring connector.

24. The apparatus according to claim 1, wherein said first, second and third low pass filters are identical to each other, said first, second and third high pass filters are identical to each other, said first, second and third telephone line modems are identical to each other, and the same protocol is used for data conducted over said first, second and third telephone wire pairs.

25. The apparatus according to claim 1, further being at least powered by a power signal carried over at least one of said telephone wire pairs.

26. The apparatus according to claim 25, wherein the power signal is an AC power signal.

27. The apparatus according to claim 1, further addressable in a digital data network.

28. The apparatus according to claim 27, further addressable in a local area network.

29. A network for transporting digital data and analog telephone signals over multiple telephone wire pairs, the network comprising:
first, second and third telephone wire pairs, each comprising two conductors connected to conduct analog signals in an analog telephone frequency band and digital data in a respective digital data frequency band distinct from, and higher than, the analog telephone frequency band;
a digital access multiplexer device connected to said first, second and third telephone wire pairs, said digital access multiplexer device being connectable to a fourth digital data unit and to an analog telephone service and being operative for standard-based packet-based full-duplex communication with the fourth digital data unit, said digital access multiplexer device comprising a router operative to couple the digital data in the digital data frequency bands of said first, second and third telephone wire pairs to the fourth digital data unit, and said digital access multiplexer device being operative for coupling said analog signals in at least one of the analog telephone frequency bands to the analog telephone service; and
first, second and third remote devices, each connected to a respective one of said first, second and third telephone wire pairs, each of said remote devices being connectable to a respective one of the first, second and third digital data units and to an analog telephone set, and each being operative for standard-based packet-based full-duplex communication with the respective one of said first, second and third digital data units, and each remote device being operative to place digital data to and from a respective digital data unit in a respective digital data frequency band and to place analog signals to and from a respective analog telephone set in a respective analog telephone frequency band; and
wherein said digital access multiplexer device and each of said first, second and third remote devices is housed in a respective single enclosure.

30. The network according to claim 29, wherein said digital access multiplexer device and each of said first, second and third remote devices are addressable in a digital data network.

31. The network according to claim 30, wherein the digital data network is a local area network.

32. The network according to claim 29, wherein the standard-based packet-based full-duplex communication conforms to IEEE802.3 standard and is based on Internet Protocol, and the connection to each of said digital data units is based on an RJ-45 connector.

33. The network according to claim 32, wherein the standard-based packet-based full-duplex communication conforms to 10BaseT or 100BaseT standard.

34. The network according to claim 29, wherein at least part of at least one of said telephone wire pairs comprises a pre-existing POTS-service telephone wire pair installed at least in part in a residence.

35. The network according to claim 29, wherein at least part of at least one of said telephone wire pairs comprises a pre-existing POTS-service telephone wire pair installed at least in part outside of a building.

36. The network according to claim 29, wherein the communication over at least one of said telephone wire pairs is DSL based.

37. The network according to claim 29, wherein the communication over all of said telephone wire pairs is DSL based.

38. The network according to claim 29, wherein the communication over all of said telephone wire pairs is ADSL based.

39. The network according to claim 29, wherein the enclosure of at least one of said devices is attachable to a wall of a building.

40. The network according to claim 39, wherein the enclosure of at least one of said devices is attachable to an external wall of a building.

41. The network according to claim 29, wherein the enclosure of at least one of said devices is at least partially housed within an outlet.

42. The network according to claim 29, wherein said first, second and third remote devices are identical to each other.

43. The network according to claim 29, wherein the same protocol is used for communication over all of said telephone wire pairs.

44. The network according to claim 29, wherein the digital data frequency band in which data is carried by at least one of said telephone wire pairs contains a plurality of distinct frequency sub-bands, and wherein at least part of the data in one frequency sub-band is distinct from the data carried over the other frequency sub-bands.

45. The network according to claim 29, wherein the digital data frequency band in which data is carried by each of said telephone wire pairs contains a plurality of distinct frequency sub-bands, and wherein at least part of the data in one frequency sub-band is distinct from the data carried over the other frequency sub-bands.

46. The network according to claim 29, wherein at least one of said telephone wire pairs is further connected to carry a power signal.

47. The network according to claim 46, wherein at least one of said devices is connected to be at least in part powered by the power signal carried over said at least one of said telephone wire pairs.

48. The network according to claim 46, wherein the power signal is an AC power signal.

49. The network according to claim 29, wherein digital data carried by one of said telephone wire pairs in the digital data frequency band is different from digital data carried by other ones of said telephone wire pairs in the digital data frequency band.

50. The network according to claim 29, wherein at least one of said telephone wire pairs is at least in part in a wall of a building and is terminated by a telephone outlet, and wherein a respective one of said remote devices is connected to said at least one of said telephone wire pairs via the telephone outlet.

51. The network according to claim 29, wherein each of said telephone wire pairs connects said digital access multiplexer device and a respective one of said remote devices in a point-to-point connection.

52. The network according to claim 29, wherein there are at least two of said digital access multiplexer devices, each located in a different building, and at least two of said remote devices are located in different buildings.

\* \* \* \* \*

UNITED STATES PATENT AND TRADEMARK OFFICE
CERTIFICATE OF CORRECTION

| | | |
|---|---|---|
| PATENT NO. | : 7,522,714 B2 | Page 1 of 1 |
| APPLICATION NO. | : 11/338855 | |
| DATED | : April 21, 2009 | |
| INVENTOR(S) | : Binder | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 679 days.

Signed and Sealed this

Fifteenth Day of March, 2011

David J. Kappos
*Director of the United States Patent and Trademark Office*